(12) United States Patent
Suzuki et al.

(10) Patent No.: US 8,344,591 B2
(45) Date of Patent: Jan. 1, 2013

(54) VIBRATION ACTUATOR AND IMAGING DEVICE

(75) Inventors: Yoshihiko Suzuki, Funabashi (JP); Eiji Matsukawa, Yotsukaido (JP); Kazuyasu Oone, Saitama (JP); Masaaki Tanabe, Fujisawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/659,494

(22) Filed: Mar. 10, 2010

(65) Prior Publication Data

US 2010/0247087 A1 Sep. 30, 2010

(30) Foreign Application Priority Data

Sep. 11, 2007 (JP) ................... 2007-235999
Oct. 5, 2007 (JP) ................... 2007-262723
Nov. 29, 2007 (JP) ................... 2007-309475

(51) Int. Cl.
*H02N 2/12* (2006.01)
(52) U.S. Cl. ............... 310/323.01; 310/323.04
(58) Field of Classification Search ............ 310/323.01–323.21, 328
See application file for complete search history.

(56) References Cited

U.S. PATENT DOCUMENTS

| | | | |
|---|---|---|---|
| 6,765,335 B2 * | 7/2004 | Wischnewskiy | 310/323.02 |
| 2005/0242686 A1 * | 11/2005 | Yamamoto et al. | 310/323.02 |
| 2006/0113868 A1 * | 6/2006 | Sakatani et al. | 310/323.17 |
| 2007/0029900 A1 | 2/2007 | Kang et al. | |
| 2007/0138915 A1 * | 6/2007 | Mulvihill et al. | 310/328 |

FOREIGN PATENT DOCUMENTS

| | | |
|---|---|---|
| JP | 02-299477 | 12/1990 |
| JP | 04-091668 | 3/1992 |

OTHER PUBLICATIONS

International Search Report for PCT/JP2008/065771, mailed on Sep. 30, 2008.
Supplemental European Search Report for corresponding European Application 08831074.3-222; dated Feb. 1, 2012.

* cited by examiner

Primary Examiner — Derek Rosenau
(74) Attorney, Agent, or Firm — Staas & Halsey LLP

(57) ABSTRACT

Provided is a vibration actuator comprising an elastic body; an electromechanical transducer that causes the elastic body to vibrate; and a rotating body that rotates in response to a drive force received from contact with the elastic body at a vibrational antinode thereof, wherein the rotating body contacts the elastic body at a prescribed position along a direction in which an axis of the rotation extends. In the vibration actuator, the elastic body includes an elastic body contact member that is arranged in a region that includes the vibrational antinode of the elastic body, the rotating body includes a rotating body contact member that receives a drive force by contacting the elastic body contact member, and one of the elastic body contact member and the rotating body contact member has a contact surface that is oriented diagonally to the axis of rotation and contacts the other of the elastic body contact member and the rotating body contact member.

20 Claims, 26 Drawing Sheets

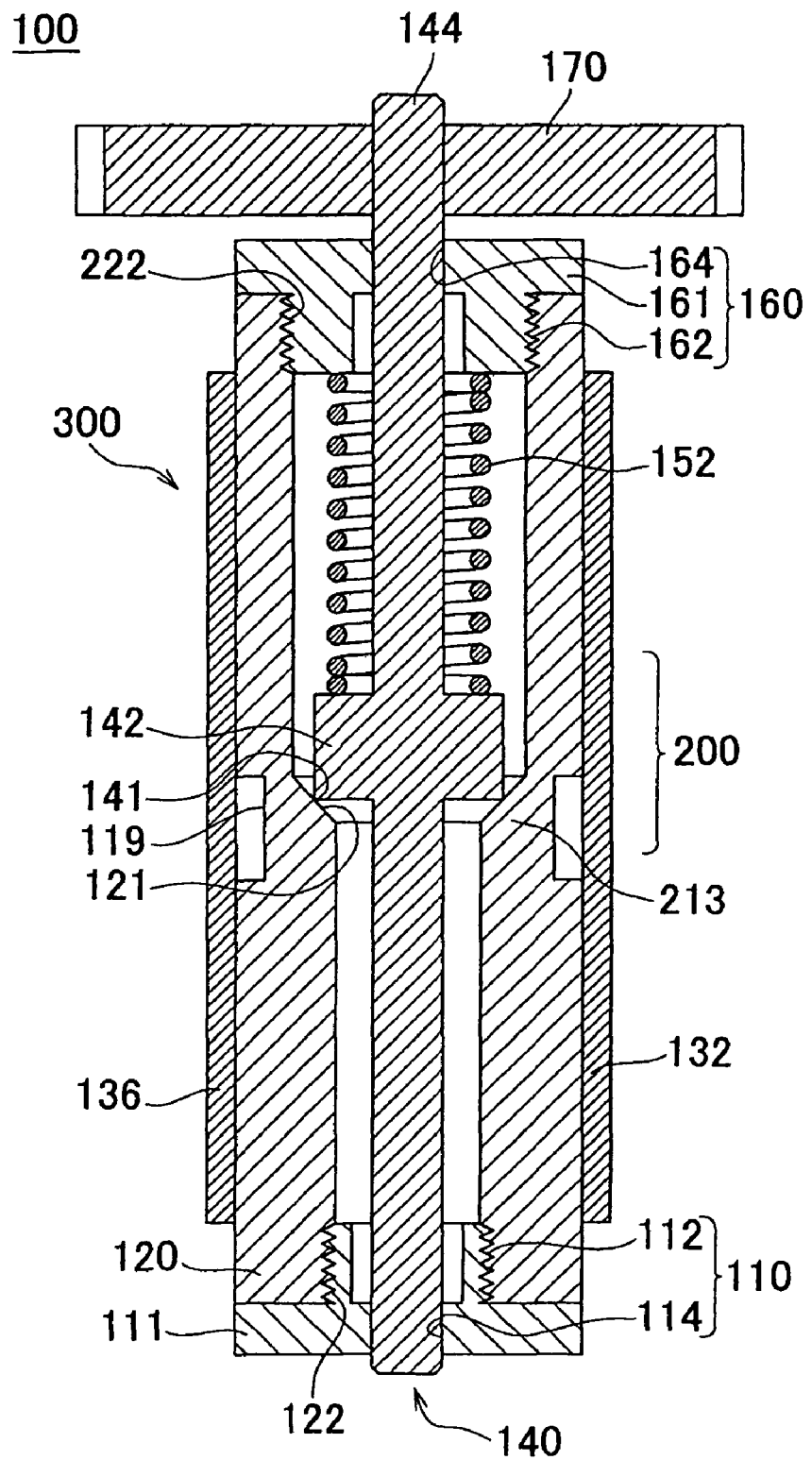
F I G . 2

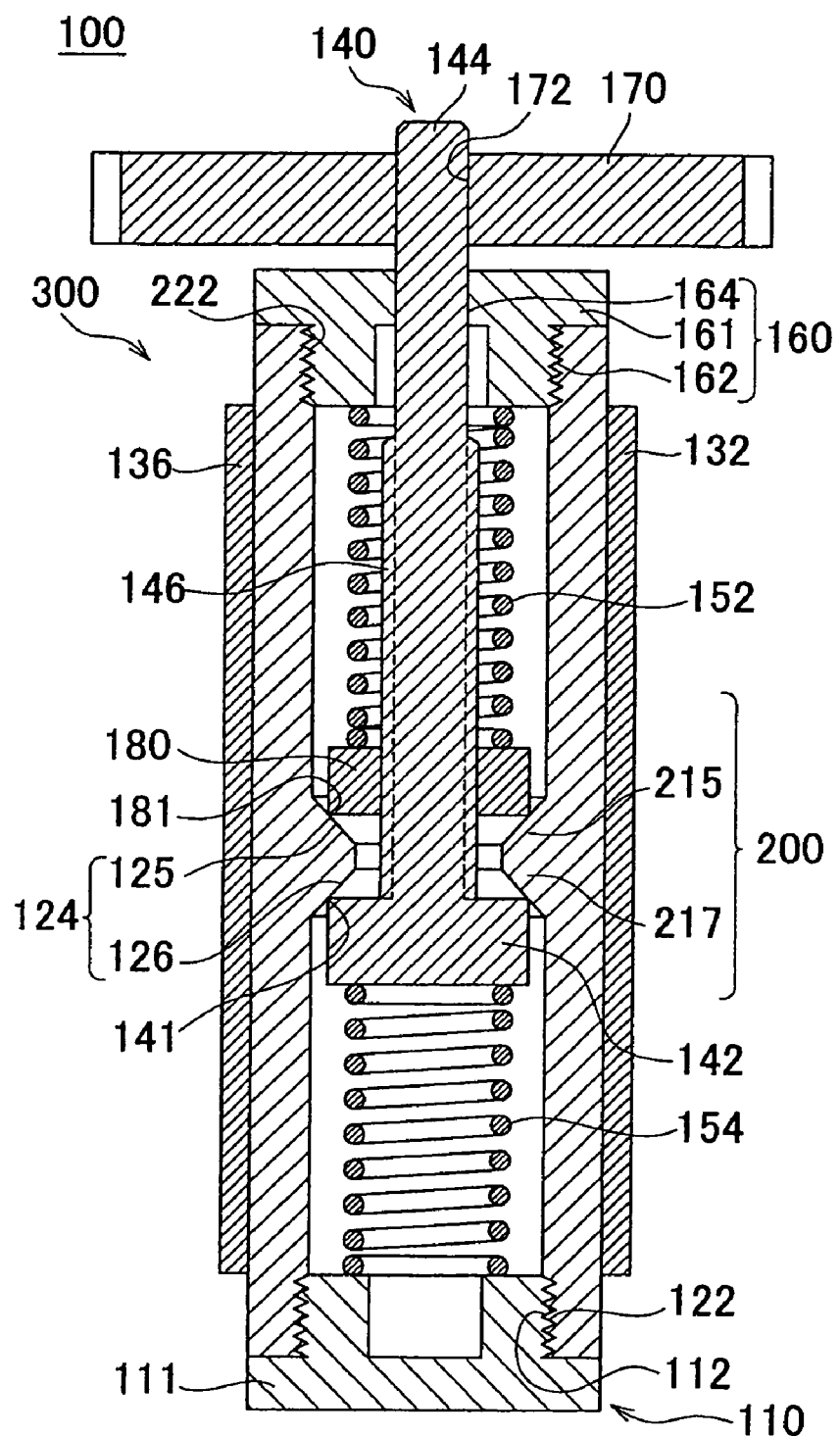
F I G . 6

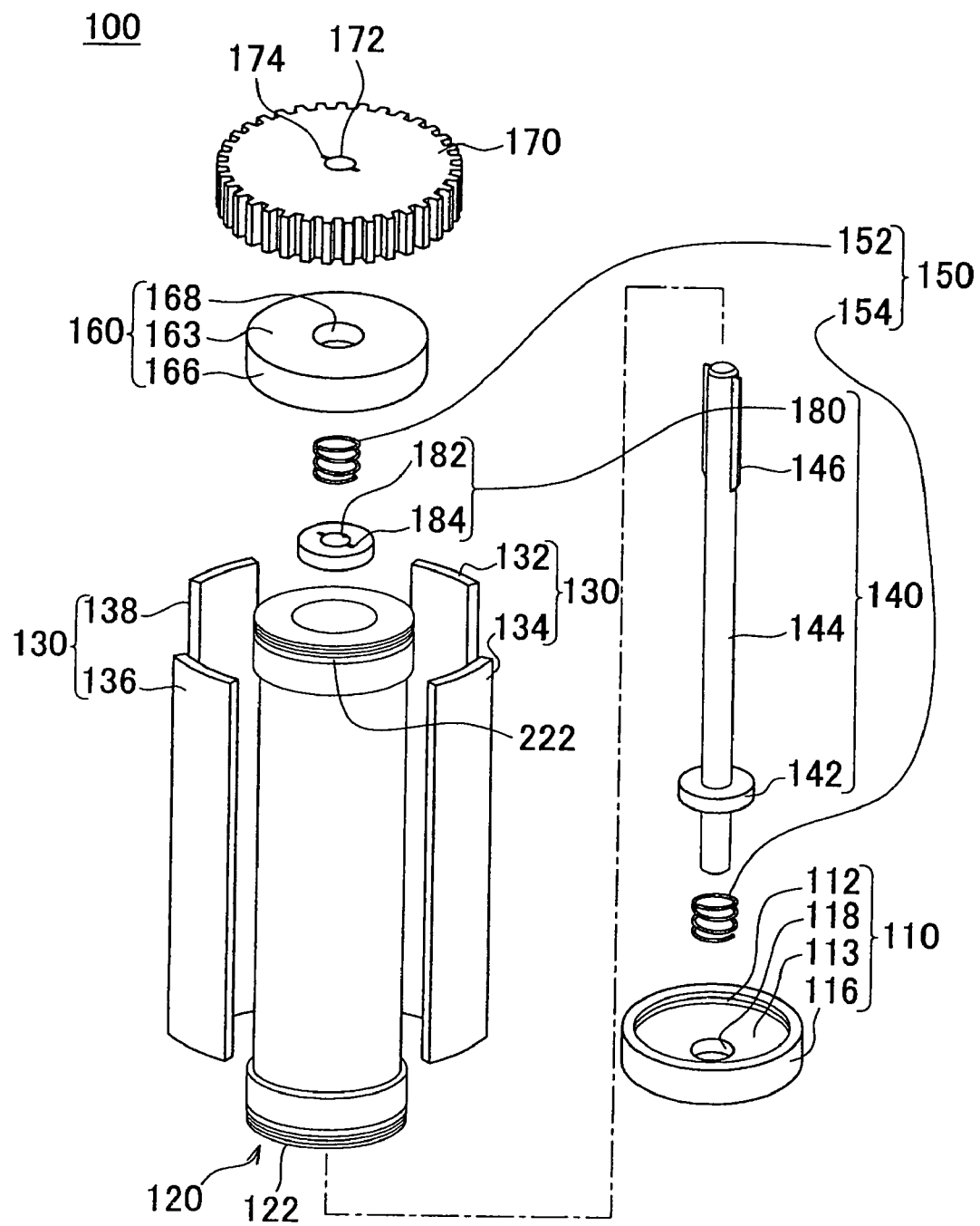
F I G . 10

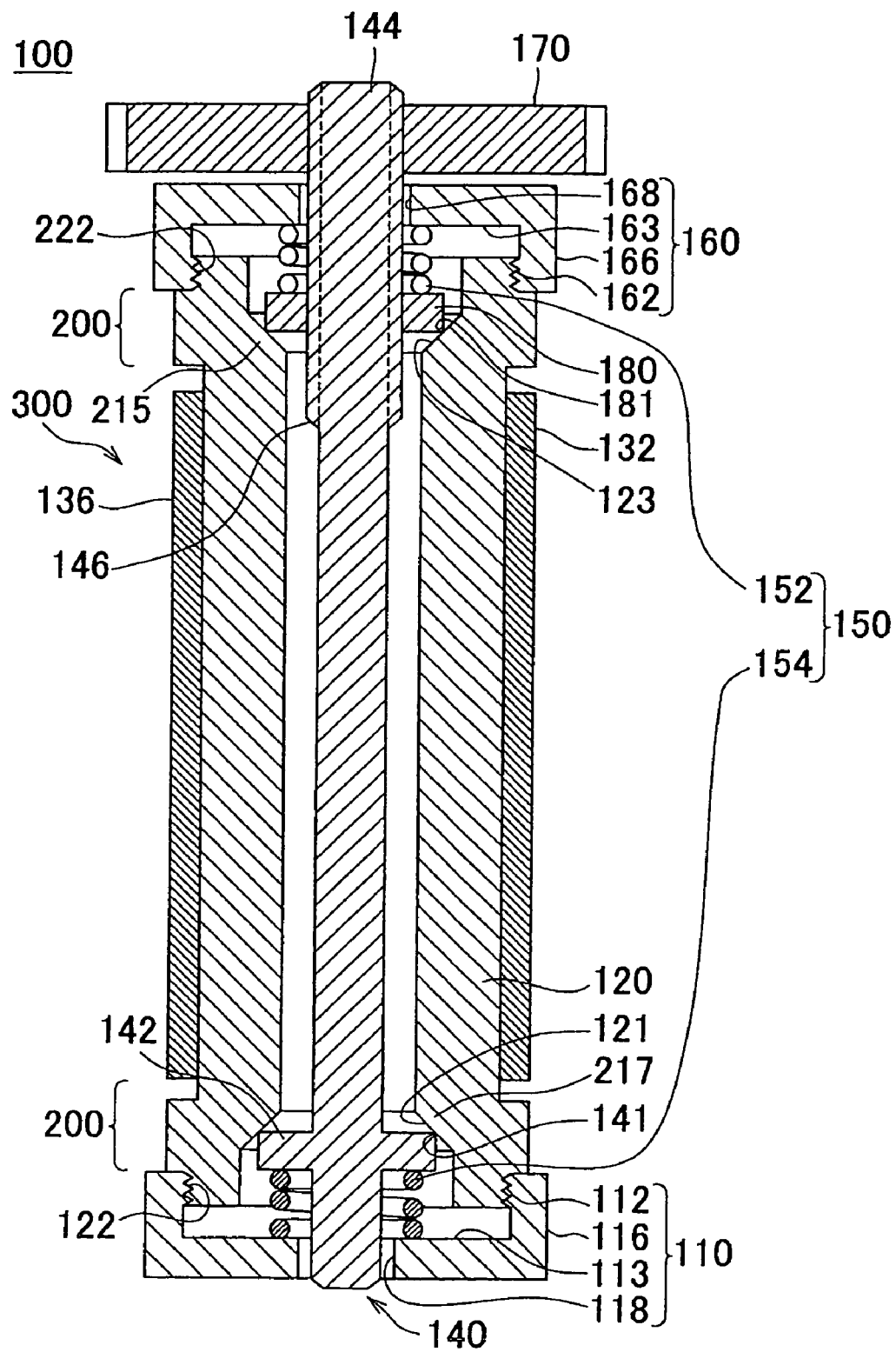
F I G . 11

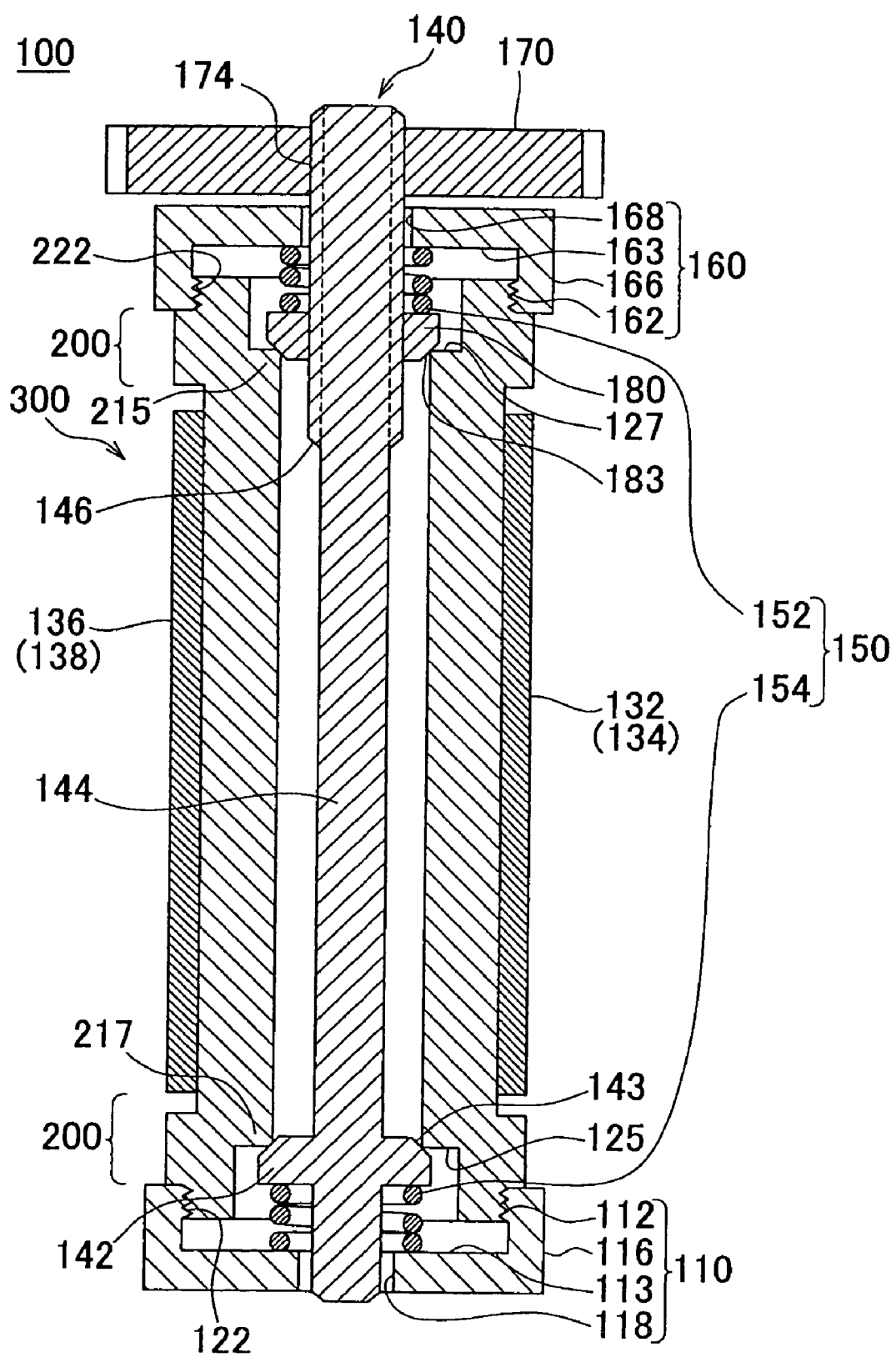
F I G . 13

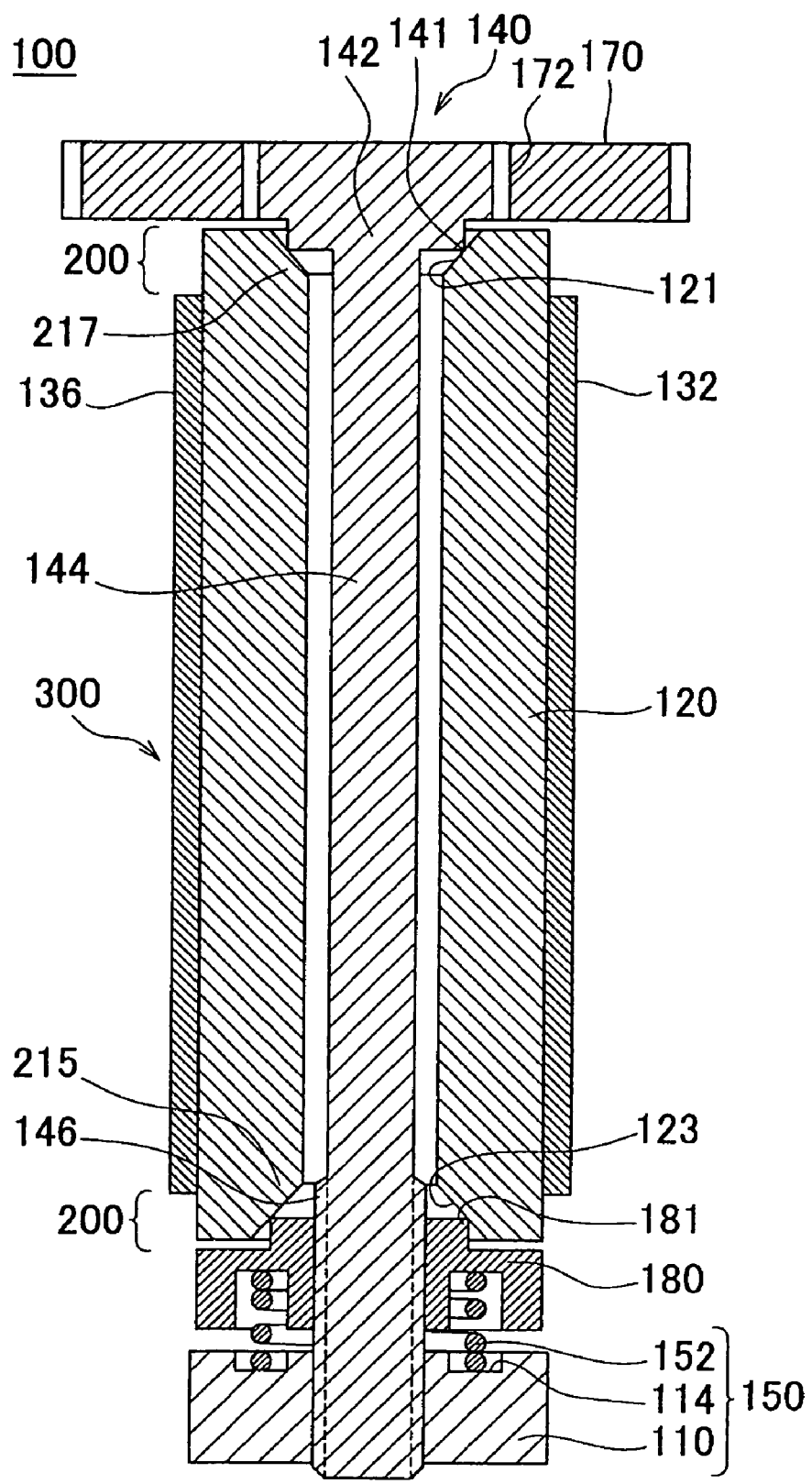
F I G. 14

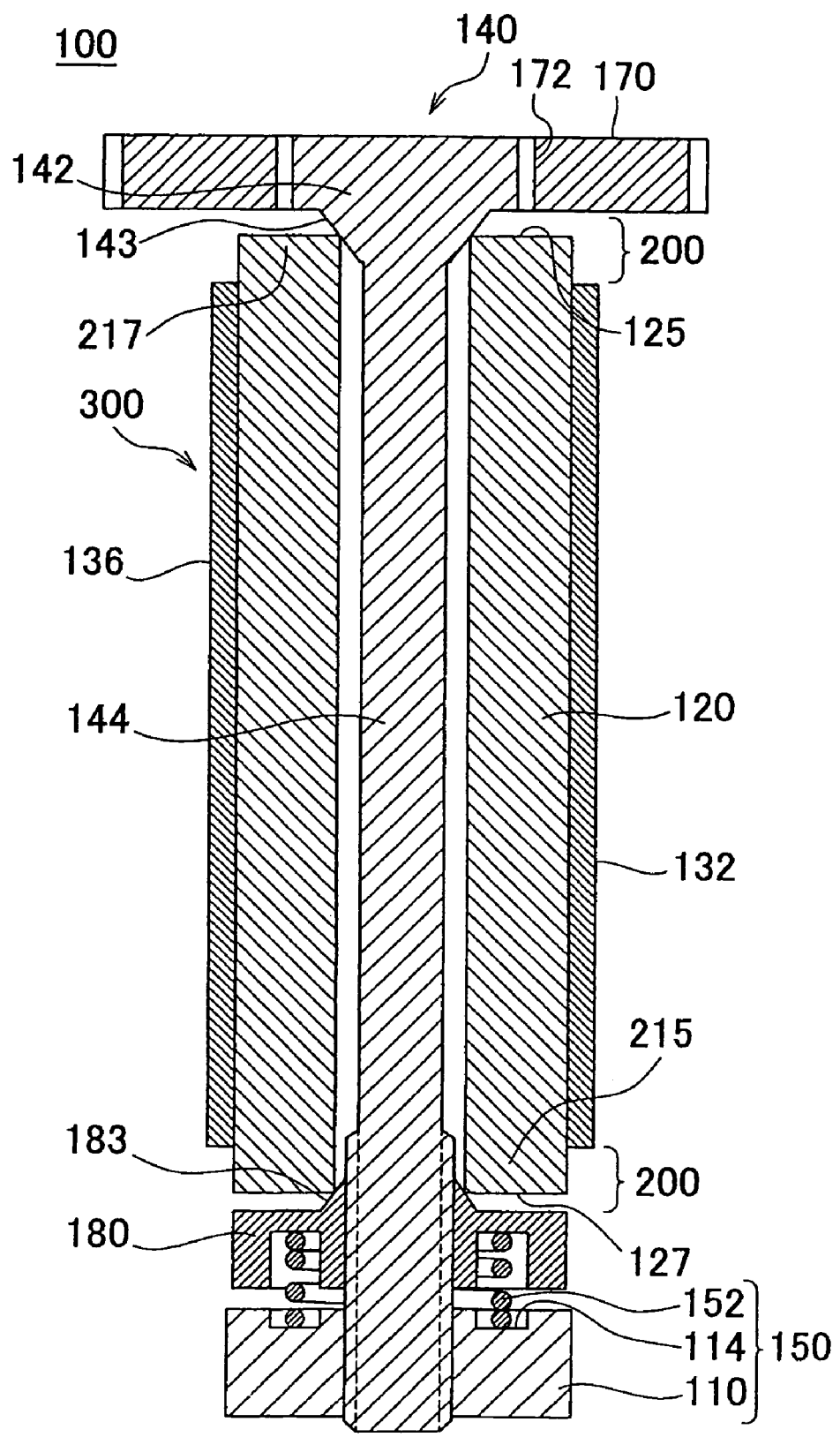
F I G. 15

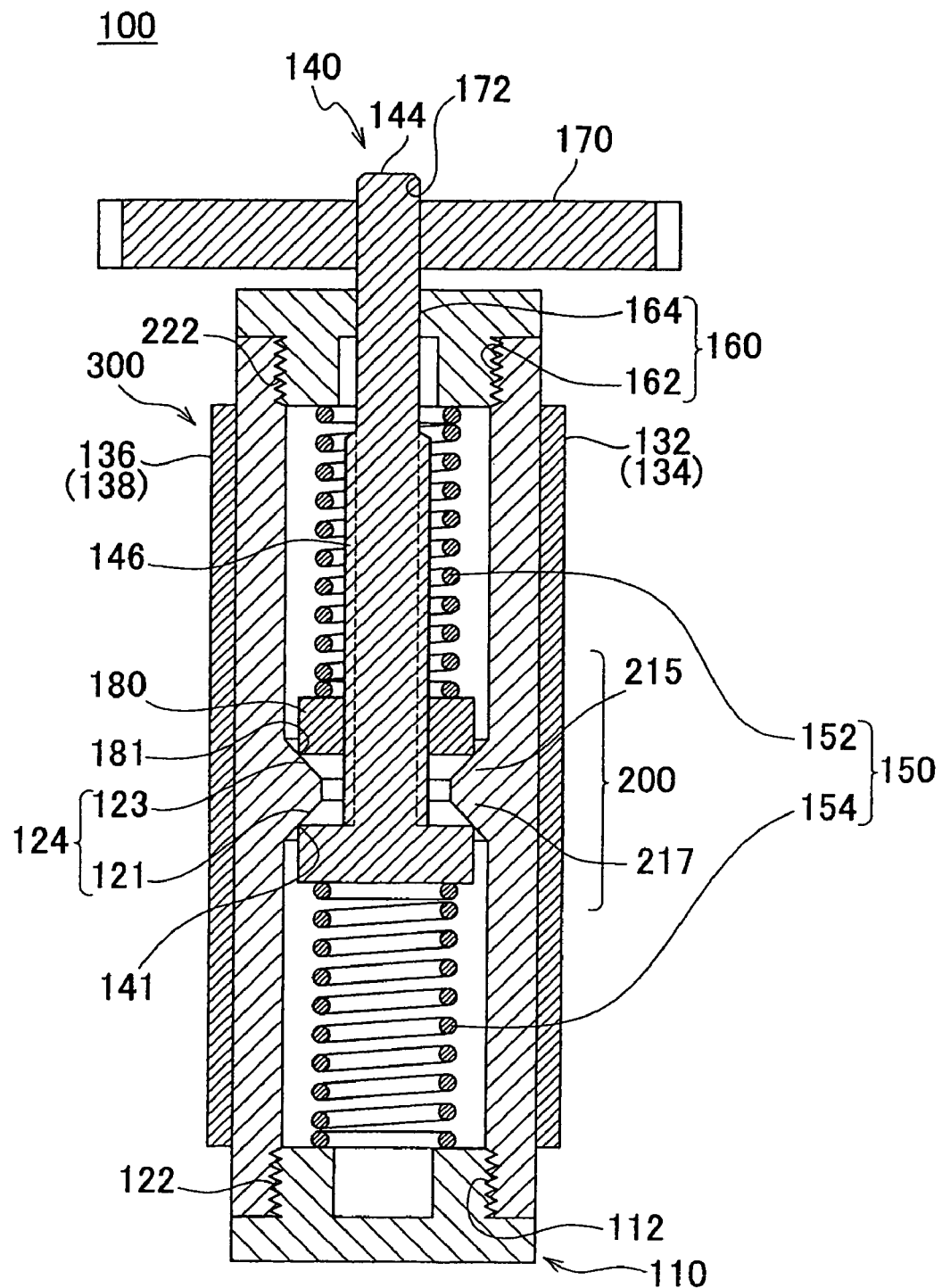
F I G. 17

VIBRATION ACTUATOR AND IMAGING DEVICE

CROSS-REFERENCE TO RELATED APPLICATIONS

This is a continuation application, filed under 35 U.S.C. §111(a), of International Application PCT/JP2008/065771, filed Sep. 2, 2008, it being further noted that foreign priority benefit is based upon Japanese Patent Applications 2007-235999 filed Sep. 11, 2007; 2007-262723 filed Oct. 5, 2007; and 2007-309475 filed Nov. 29, 2007.

BACKGROUND

1. Technical Field

The present invention relates to a vibration actuator and an image capturing apparatus.

2. Related Art

U.S. Pat. No. 6,940,209 discloses a structure of a lead screw ultrasonic motor. This ultrasonic motor uses vibration of a vibrating body to move a threaded shaft back and forth in an axial direction. Japanese Patent Application Publication No. 2007-049897 discloses a tube ultrasonic motor. This ultrasonic motor includes an elastic body made of ceramic and has good abrasion resistance.

The ultrasonic motors disclosed above have an appropriate clearance between the vibrating body and the threaded shaft or rotating member. However, the settings for this clearance depend entirely on the precision of the dimensions of the components. Therefore, if there is dust or the like between the vibrating body and the threaded shaft, the vibration of the vibrating body cannot be smoothly transferred. In addition, manufacturing variations, environmental conditions, a difference in load, or the like may change the operational efficiency. Furthermore, material with good abrasion resistance, such as ceramic, is expensive and is difficult to process. Therefore, vibration actuators using such material are more expensive, and the range of possible uses is limited.

SUMMARY

Therefore, it is an object of an aspect of the innovations herein to provide a vibration actuator and an image capturing apparatus, which are capable of overcoming the above drawbacks accompanying the related art. The above and other objects can be achieved by combinations described in the independent claims. The dependent clims define further advantageous and exemplary combinations of the innovations herein.

According to a first aspect related to the innovations herein, one exemplary vibration actuator may comprise an elastic body; an electromechanical transducer that causes the elastic body to vibrate; and a rotating body that rotates in response to a drive force received from contact with the elastic body at a vibrational antinode thereof, wherein the rotating body contacts the elastic body at a prescribed position along a direction in which an axis of the rotation extends.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 2 is a vertical cross-sectional view of the vibration actuator 100.

FIG. 6 is a vertical cross-sectional view of the vibration actuator 100 according to another embodiment of the present invention.

FIG. 10 is an exploded perspective view of a vibration actuator 100 according to an embodiment of the present invention.

FIG. 11 is a vertical cross-sectional view of the vibration actuator 100.

FIG. 13 is a partial cross-sectional view of another configuration of the work section 200.

FIG. 14 is a vertical cross-sectional view of the vibration actuator 100 according to another embodiment.

FIG. 15 is a vertical cross-sectional view of the vibration actuator 100 according to another embodiment.

FIG. 17 is a vertical cross-sectional view of the vibration actuator 100 according to another embodiment.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

First Embodiment

Figure 1:
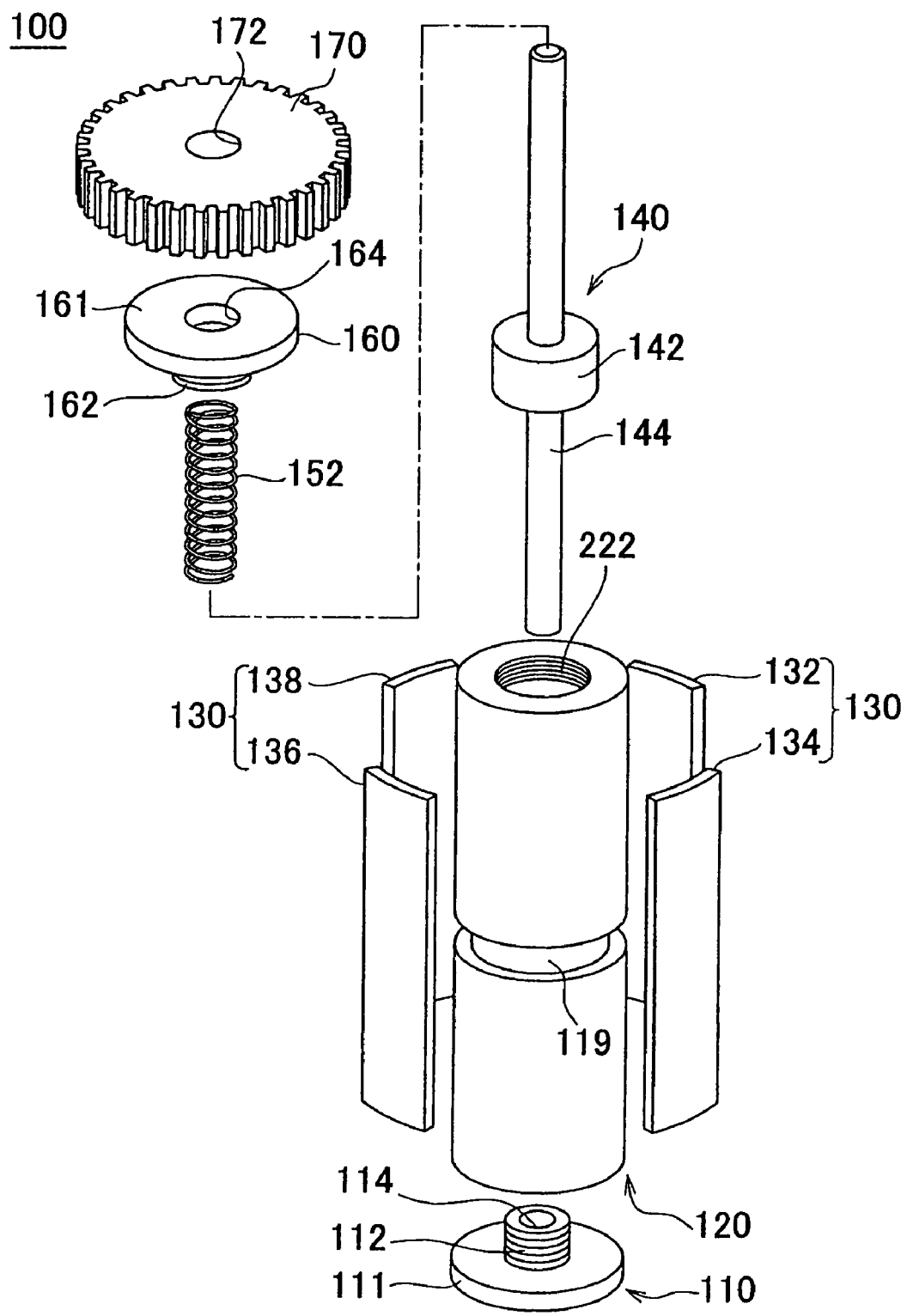
FIG. 1 is an exploded perspective view of a vibration actuator 100 according to an embodiment of the present invention.

FIG. 1 is an exploded perspective view of a vibration actuator 100 according to an embodiment of the present invention. In the following description, each component has top and bottom ends in the axial direction, with the same orientation as shown in FIG. 1. However, this does not mean that the use of the vibration actuator 100 is limited to the orientation shown in FIG. 1.

The vibration actuator 100 includes an elastic body 120, an electromechanical transducer 130 that shakes the elastic body 120 to cause vibration, and a rotating body 140 that contacts the elastic body 120 at a central portion thereof and rotates in response to a drive force of the vibration applied to the end of the elastic body 120. The vibration actuator 100 includes position setting components 110 and 160 that rotatably support the rotating body 140, a biasing member 152 that biases the rotating body 140, and an output gear 170 that transmits the rotation of the rotating body 140 to the outside.

The rotating body 140 includes a cylindrical rotation transmitting axle 144 and an integrated rotating body contact member 142 formed integrally with the rotation transmitting axle 144 at the center of the rotation transmitting axle 144 in the axial direction. The outer diameter of the integrated rotating body contact member 142 is greater than the outer diameter of the rotation transmitting axle 144.

The elastic body 120 is a cylinder that is shorter than the rotating body 140 and has a through hole extending longitudinally therethrough. The through hole has a circular cross section and has an inner diameter at an upper end thereof that is greater than the outer diameter of the integrated rotating body contact member 142. The through hole has groove portions 122 and 222, not shown, positioned near the other end thereof.

A thinned portion 119 is formed by decreasing the outer diameter of the elastic body 120 at the approximate longitudinal center thereof. The wall thickness of the elastic body 120 is less at the region where the thinned portion 119 is formed. The elastic body 120 can be formed of various metals, plastics, or ceramics.

The electromechanical transducer 130 includes electromechanical transducer elements 132, 134, 136, and 138 that have dimensions allowing arrangement at three or more, preferably four or more, regions. Each of the electromechanical transducer elements 132, 134, 136, and 138 has substantially the same dimensions, and is formed as a rectangle whose length is along the longitudinal direction of the elastic body 120 and curved to wrap partially around the outer surface of the elastic body 120.

The electromechanical transducer elements 132, 134, 136, and 138 include piezoelectric materials that expand when a drive voltage is applied thereto. Examples of such piezoelectric materials include lead zirconate titanate, crystal, lithium niobate, barium titanate, lead titanate, lead metaniobate, polyvinylidene difluoride, lead zinc niobate, lead scandium niobate, and the like.

Many piezoelectric materials are fragile, and so these materials are desirably reinforced with a highly elastic metal such as phosphor bronze. Instead, the elastic body 120 itself may serve as a support structure and the electromechanical transducer elements 132, 134, 136, and 138 may be formed by creating a piezoelectric material layer on the surface of the elastic body 120. The electrodes used when applying the drive voltage to the piezoelectric material may be made of nickel, gold, or the like and formed directly on the surface of the dielectric material using techniques such as plating, sputtering, vapor deposition, or thin film printing.

The position setting component 110 includes a flange 111 and a threaded portion 112. The position setting component 160 includes a flange 161 and a threaded portion 162. In the position setting components 110 and 160, the flanges 111 and 161 each have an external diameter that is greater than the internal diameter of the through hole of the elastic body 120.

The flanges 111 and 161 each have an outer diameter that is greater than the inner diameter of the through hole of the elastic body 120.

Bearing units 114 and 164 having inner diameters that are substantially the same as the outer diameter of the rotation transmitting axle 144 are formed in the center of the flanges 111 and 161. The threaded portions 112 and 162 have dimensions that allow for threading with the groove portions 122 and 222 of the elastic body 120.

The biasing member 152 has an outer diameter that is smaller than the outer diameter of the integrated rotating body contact member 142, and has an inner diameter that is larger than the outer diameter of the rotation transmitting axle 144. FIG. 1 shows this biasing member 152 as a coil spring through which the rotating body 140 is inserted, but the structure is not limited to this.

The output gear 170 has an axle hole 172 in the center thereof. The axle hole 172 has an inner diameter suitable for accommodating the rotation transmitting axle 144 of the rotating body 140. When the rotation transmitting axle 144 is inserted in the axle hole 172, the output gear 170 rotates integrally with the rotating body 140.

FIG. 2 is a vertical cross-sectional view of the vibration actuator 100. Components that are the same as those shown in FIG. 1 are given the same reference numerals, and redundant descriptions are omitted.

The electromechanical transducer 130 including the electromechanical transducer elements 132, 134 (not shown), 136, and 138 (not shown) is affixed on the outer surface of the elastic body 120 to form the vibrating body 300. As a result, when the drive voltage is applied to expand one of the electromechanical transducer elements 132, 134, 136, and 138, the portion of the elastic body 120 affixed to this one of the electromechanical transducer elements 132, 134, 136, and 138 also expands.

The through hole of the elastic body 120 has an inner diameter that is larger at the top and smaller at the bottom in FIG. 2. An elastic body contact member 213 that has a different internal diameter is formed in the center of the through hole to engage with a slanted drive surface 121. The slanted drive surface 121 has an annular bowl-shaped surface along the inner surface of the elastic body 120.

The position setting components 110 and 160 are mounted at both longitudinal ends of the elastic body 120 by threading the groove portions 122 and 222 with the threaded portions 112 and 162. The mounted position setting components 110 and 160 are stopped at the ends of the elastic body 120 by the flanges 111 and 161 contacting the end surfaces of the elastic body 120.

In the present embodiment, the position setting components 110 and 160 are fixed by threading the threaded portion 112 of the position setting component 110 with the groove portion 122 of the elastic body 120 and treading the threaded portion 162 of the position setting component 160 with the groove portion 222 of the elastic body 120. However, the position setting components 110 and 160 may instead be fixed to the elastic body 120 using methods such as adhesion, interlocking, or the like.

The rotating body 140 is inserted through the through hole of the elastic body 120. Here, the top and bottom ends of the rotation transmitting axle 144 extend outside through the bearing units 114 and 164 of the position setting components 110 and 160. The rotation transmitting axle 144 extends further outward on the top side, so that the output gear 170 can be attached on the top end.

The output gear 170 is attached to one end of the rotating body 140 in the present example. However, by extending the rotation transmitting axle 144 further downward, output gears 170 can be attached to both ends of the rotating body 140.

The position of the rotation transmitting axle 144 is fixed while allowing for rotation by the bearing units 114 and 164 of the position setting components 110 and 160. The bearing units 114 and 164 may be rolling bearings, sliding bearings, or the like. The gap between the bearing units 114, 164 and the rotation transmitting axle 144 is small enough to prevent dust from entering the elastic body 120.

The integrated rotating body contact member 142 contacts the drive surface 121 on the inner surface of the elastic body 120. In other words, the through hole of the elastic body 120 has an inner diameter above the drive surface 121 that is larger than the outer diameter of the integrated rotating body contact member 142. Furthermore, the through hole of the elastic body 120 has an inner diameter below the drive surface 121 that is smaller than the outer diameter of the integrated rotating body contact member 142. As a result, the bottom edge of the integrated rotating body contact member 142 contacts the drive surface 121 to serve as the drive receiving portion 141.

The biasing member 152 is arranged inside the elastic body 120 and the rotation transmitting axle 144 is inserted therethrough. Here, the top end of the biasing member 152 contacts the bottom surface of the position setting component 160 and the bottom end of the biasing member 152 contacts the top surface of the integrated rotating body contact member 142.

The biasing member 152 is arranged in a compressed state between the position setting component 160 and the integrated rotating body contact member 142. Accordingly, the biasing member 152 biases the integrated rotating body contact member 142 downward.

The biased integrated rotating body contact member 142 engages with the drive surface 121 formed by the elastic body contact member 213 of the elastic body 120. In this way, the drive receiving portion 141 of the integrated rotating body contact member 142 is pressed against the drive surface 121 of the elastic body 120. With this configuration, a work section 200 can be formed that rotationally drives the rotating body 140 with the vibration of the vibrating body 300, which is described further below.

The integrated rotating body contact member 142 rotates as a portion of the rotating body 140. Therefore, at least one end of the biasing member 152 slides on the components which are contacted thereby. By decreasing the friction of these sliding portions, damage to the vibration actuator 100 due to this movement can be decreased. More specifically, a lubricant may be applied to the sliding portions.

Figure 3A:
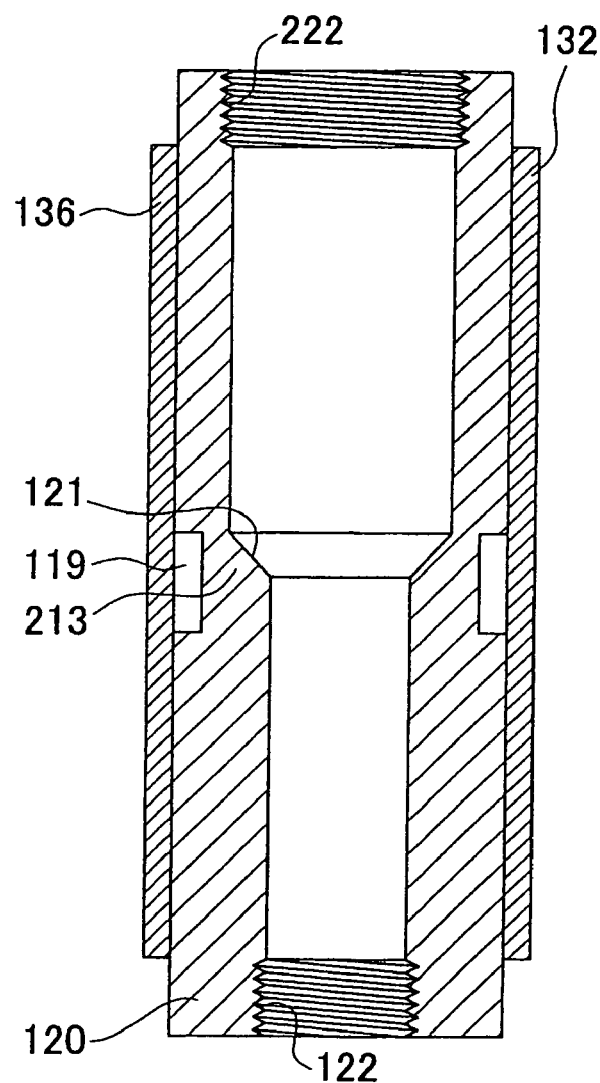
FIGS. 3A and 3B are schematic diagrams showing the operation of the vibration actuator 100.
Figure 3B:
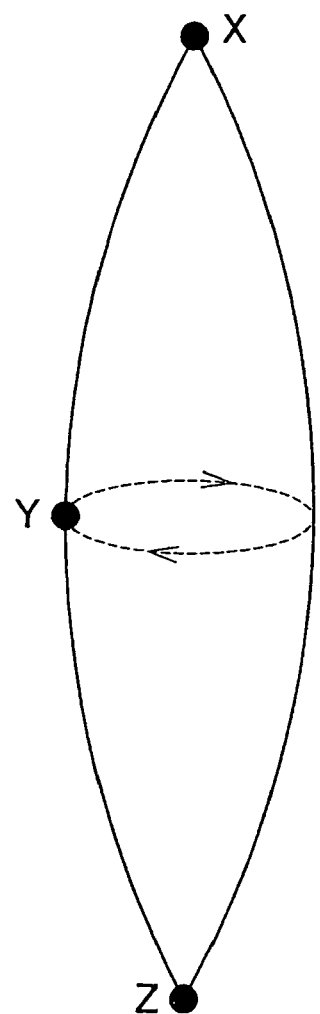

FIGS. 3A and 3B are schematic diagrams showing the behavior of the vibrating body 300 when the vibration actuator 100 operates. In the present embodiment, the vibrating body 300 is supported at both ends from the outside, but may instead be supported at other positions.

In the vibrating body 300 of FIG. 3A, the electromechanical transducer elements 132, 134 (not shown), 136, and 138 (not shown) expand in the longitudinal direction of the elastic body 120 when the drive voltage is applied. When one of the electromechanical transducer elements 132, 134, 136, and 138 expands, the portion of the elastic body 120 contacting this electromechanical transducer element 132, 134, 136, or 138 also expands, thereby bending the elastic body 120.

When the drive voltage is applied to the each of the electromechanical transducer elements 132, 134, 136, and 138 sequentially in a direction of the circumference of the elastic body 120, the curve of the elastic body 120 sequentially changes. When an AC electric field with a phase sequentially delayed by π/2 is applied to each of the electromechanical transducer elements 132, 134, 136, and 138, the vibrating body 300 vibrates in a circular motion orthogonal to the plane of FIG. 3A.

The vibrating body 300 is supported from the outside at both ends. Therefore, during vibration, the longitudinal center of the vibrating body 300 forms an antinode Y in a direction orthogonal to the plane of FIG. 3A. As a result, as shown in FIG. 3B, the entire vibrating body 300 vibrates such that the top and bottom ends are nodes Z and X while the center forms the antinode Y.

The horizontal movement of the vibrating body 300 during vibration is greatest at the approximate longitudinal center thereof. Therefore, by contacting the integrated rotating body contact member 142 at the portion of the vibrating body 300 shown by the antinode Y during vibration, the integrated rotating body contact member 142 is efficiently rotated circumferentially.

The integrated rotating body contact member 142 is biased downward by the biasing member 152. Accordingly, the drive receiving portion 141 is pressed by the drive surface 121. The horizontal movement of the drive surface 121 caused by the vibration of the elastic body 120 is transmitted to the integrated rotating body contact member 142 via the slanted drive receiving portion 141. When the horizontal movement is transmitted to the drive receiving portion 141, the integrated rotating body contact member 142 moves in the axial direction against the bias of the biasing member 152.

When the integrated rotating body contact member 142 moves in the axial direction, a gap occurs between the drive receiving portion 141 and the drive surface 121. Furthermore, the vibration causes the direction of movement of the drive surface 121 to rotate, which leads to friction between the drive receiving portion 141 and the drive surface 121 for rotating the integrated rotating body contact member 142. The rotation of the integrated rotating body contact member 142 caused by this friction is transmitted to the outside via the rotation transmitting axle 144 and the output gear 170.

In the vibrating body 300, the elastic body 120 has lowered bending rigidity at a central portion thereof in the axial direction, due to the thinned portion 119. The portion with low bending rigidity allows the vibration indicated by the antinode Y to occur more easily. By forming the longitudinal bending rigidity distribution of the vibrating body 300 in this way, the position at which the work section 200 experiences the vibration of the antinode Y can be accurately set to the position shown in FIG. 3B. The bending rigidity distribution can be formed by thinning the shape of the vibrating body 300 including the elastic body 120 and the electromechanical transducer 130 in advance or after processing.

The frequency of the drive voltage applied to the electromechanical transducer 130 desirably includes a resonance frequency corresponding to the characteristic frequency of the vibrating body 300. Therefore, the vibrating body 300 is efficiently vibrated by the drive power provided thereto, and this vibration can be continued. The vibrating body 300 may have another vibration mode that uses a plurality of nodes and antinodes.

The present embodiment uses an electromechanical transducer 130 that includes four electromechanical transducer elements 132, 134, 136, and 138 arranged at uniform intervals, but the configuration of the electromechanical transducer 130 is not limited to this. The vibrating body 300 can achieve vibration using an electromechanical transducer 130 that includes three or more of the electromechanical transducer elements arranged around the circumference of the elastic body 120.

In the work section 200, the drive receiving portion 141 and the drive surface 121 repeatedly contact and separate from each other. Accordingly, at least the surfaces of the drive receiving portion 141 and the drive surface 121 can be formed of a material with high abrasion resistance, such as ceramic. As a result, the lifespan of the vibration actuator 100 can be increased.

Figure 4:
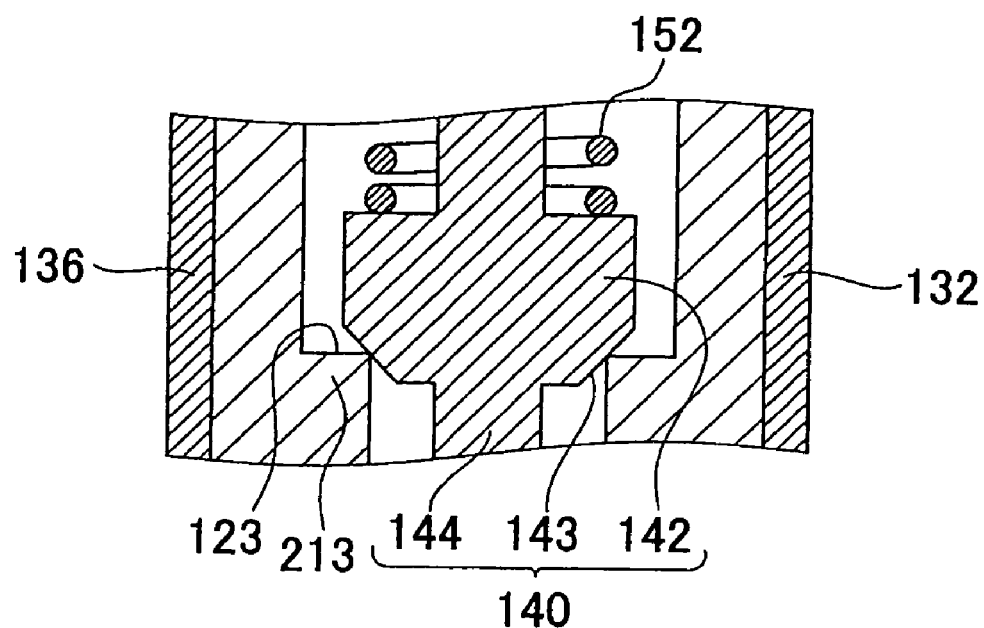
FIG. 4 is a partial cross-sectional view of another configuration of the work section 200.

FIG. 4 is a partial cross-sectional view of another configuration of the work section 200 in the vibration actuator 100. Aside from the portion described below, the configuration and operation of the vibration actuator 100 is the same as those of the vibration actuator 100 described in FIG. 1, and redundant descriptions are omitted.

In this work section 200, the integrated rotating body contact member 142 includes a slanted drive receiving surface 143 at the bottom edge thereof. The slanted drive receiving surface 143 is formed as a ring-shaped truncated cone along the outer surface of the integrated rotating body contact member 142. The through hole of the elastic body 120 has an elastic body contact member 213 that forms a horizontal drive surface 123 orthogonal to the axis of the rotating body 140 at a border between the portion of the through hole with a large internal diameter and the portion with a small internal diameter.

The integrated rotating body contact member 142 is biased downward by the biasing member 152. Accordingly, the drive receiving surface 143 is pressed by the inner surface edge of the drive surface 123. The horizontal movement of the drive surface 123 caused by the vibration of the elastic body 120 is transmitted to the integrated rotating body contact member 142 via the slanted drive receiving surface 143.

When the horizontal movement is transmitted to the drive receiving surface 143, the integrated rotating body contact member 142 moves in the axial direction against the bias of the biasing member 152. Accordingly, the drive surface 123 and the drive receiving surface 143 have a partial contact point along their circumferences. This contact point rotates along the circumference of the integrated rotating body contact member 142 according to the vibration, thereby rotating the rotating body 140.

Figure 5:
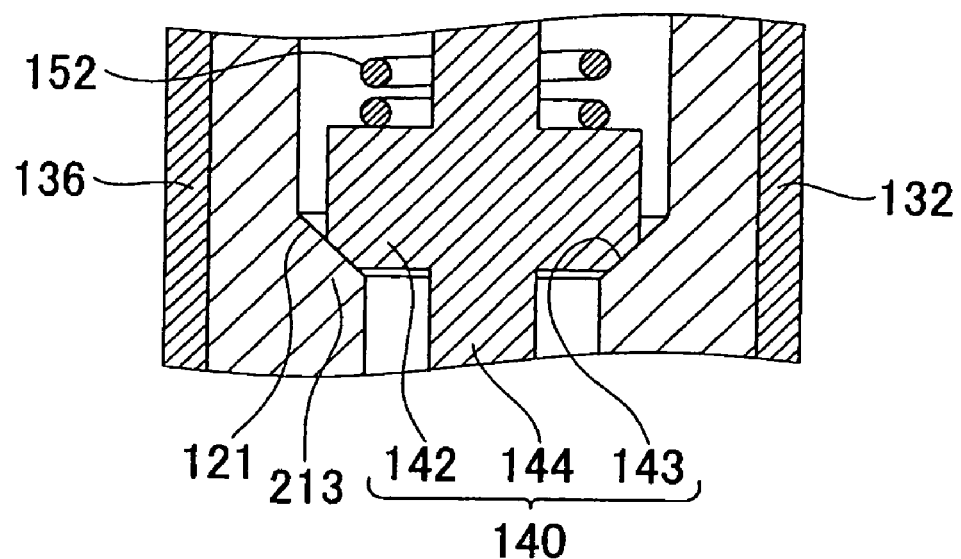
FIG. 5 is a partial cross-sectional view of yet another configuration of the work section 200.

FIG. 5 is a partial cross-sectional view of yet another configuration of the work section 200 in the vibration actuator 100. Aside from the portion described below, the configuration and operation of the vibration actuator 100 is the same as those of the vibration actuator 100 described in FIG. 1, and redundant descriptions are omitted.

In this work section 200 as well, the integrated rotating body contact member 142 includes a slanted drive receiving surface 143 at the bottom edge thereof. The slanted drive receiving surface 143 is formed as a ring-shaped truncated cone along the outer surface of the integrated rotating body contact member 142. The through hole of the elastic body 120 has the slanted drive surface 121, which is the same as the drive surface 121 shown in the work section 200 of FIG. 2.

The integrated rotating body contact member 142 is biased downward by the biasing member 152. Accordingly, the drive receiving surface 143 is pressed by the drive surface 121. The horizontal movement of the drive surface 121 caused by the vibration of the elastic body 120 is transmitted to the integrated rotating body contact member 142 via the slanted drive receiving surface 143.

When the horizontal movement is transmitted to the drive receiving surface 143, the integrated rotating body contact member 142 moves in the axial direction against the bias of the biasing member 152. Accordingly, the drive surface 121 and the drive receiving surface 143 have a prescribed contact point along their circumferences. This contact point rotates along the circumference of the integrated rotating body contact member 142 according to the vibration, thereby rotating the rotating body 140.

In this work section 200, the surfaces of the drive surface 121 and the drive receiving surface 143 contact each other. Accordingly, the friction between the drive surface 121 and the drive receiving surface 143 during operation of the vibration actuator 100 is decreased, enabling reliable operation over a long period of time.

FIG. 6 is a vertical cross-sectional view of the vibration actuator 100 according to another embodiment of the present invention. Aside from the portion described below, the configuration and operation of the vibration actuator 100 is the same as those of the vibration actuator 100 described in FIG. 1, and therefore components common to both vibration actuators 100 are given the same reference numerals and redundant descriptions are omitted.

The through hole of the elastic body 120 has the same internal diameter at both ends thereof, but has a small-diameter portion 124 with a smaller internal diameter formed in the approximate longitudinal center thereof. The small-diameter portion 124 is a portion of the inner surface of the through hole that protrudes further inward. The small-diameter portion 124 includes a first elastic body contact member 215 having a drive surface 125 that faces the top end of the elastic body 120 and a second elastic body contact member 217 having a drive surface 126 that faces the bottom end of the elastic body 120.

The rotating body 140 includes the cylindrical integrated rotating body contact member 142 as a first rotating body contact member that contacts the drive surface 126 from below, the rotation transmitting axle 144 that extends from the upper surface of the integrated rotating body contact member 142 beyond the position setting component 160, and a rotation transmitting rib 146 that is formed on the circumferential surface of the rotation transmitting axle 144 in the elastic body 120.

The rotating body 140 further includes a cylindrical floating rotating body contact member 180 as a second rotating body contact member that contacts the drive surface 126 from above. The floating rotating body contact member 180 has the rotation transmitting axle 144 inserted therethrough, and can slide freely in the axial direction of the rotation transmitting axle 144.

The rotating body 140 has the integrated rotating body contact member 142 as the bottom end thereof. Therefore, the position setting component 110 at the bottom of the vibration actuator 100 does not support the rotating body 140. However, for ease of explanation, the position setting component 110 will be included.

In addition to the biasing member 152 arranged between the position setting component 160 and the floating rotating body contact member 180, this vibration actuator 100 also includes a biasing member 154 arranged between the position setting component 110 and the integrated rotating body contact member 142. Each of the biasing members 152 and 152 are provided in a compressed state.

Accordingly, the biasing member 152 presses downward on the floating rotating body contact member 180. As a result, the drive receiving portion 181 at the bottom edge of the floating rotating body contact member 180 presses against the drive surface 125. In addition, the biasing member 154 presses upward on the integrated rotating body contact member 142. As a result, the drive receiving portion 141 at the top edge of the integrated rotating body contact member 142 presses against the drive surface 126.

In the embodiment described above, the expanding force of the compressed biasing members 152 and 154 biases the integrated integrated rotating body contact member 142 and the floating rotating body contact member 180. However, the configuration of the biasing unit 150 is not limited to this. For example, the biasing member 152 may be engaged with the integrated integrated rotating body contact member 142 and the floating rotating body contact member 180 in an expanded state to provide a bias drawing the integrated integrated rotating body contact member 142 and the floating rotating body contact member 180 toward each other.

Figure 7:
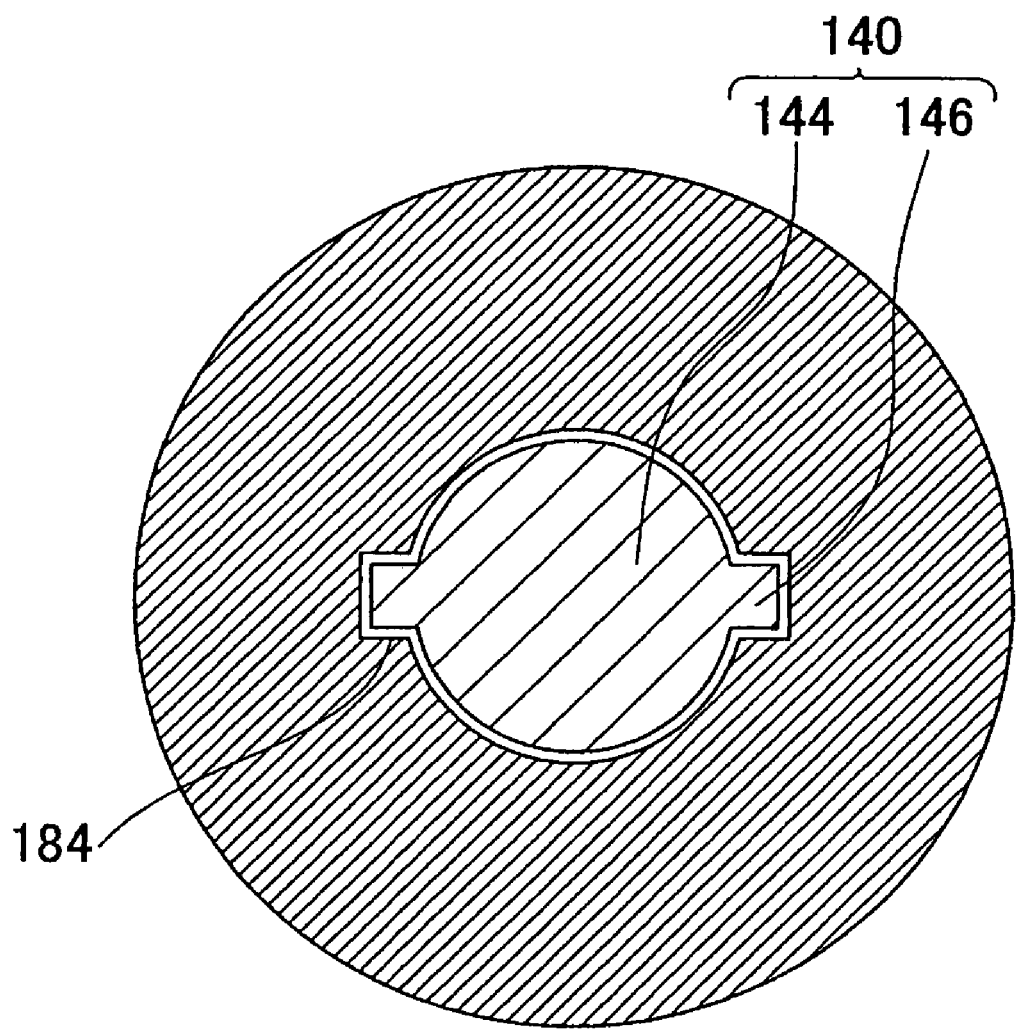
FIG. 7 is a horizontal cross-sectional view of the configuration of the floating rotating body contact member 180.

FIG. 7 is a horizontal cross-sectional view of the configuration for transmitting the rotation from the floating rotating body contact member 180 to the rotation transmitting axle 144 in the vibration actuator 100 shown in FIG. 6. The rotation transmitting axle 144 includes a pair of rotation transmitting ribs 146 that protrude radially outward from the circumferential surface of the rotation transmitting axle 144 and extend in the radial direction. Notches 184 with shapes complementary to the rotation transmitting ribs 146 are formed on the inside of the floating rotating body contact member 180.

The rotation transmitting ribs 146 of the rotation transmitting axle 144 are inserted through the notches 184 of the floating rotating body contact member 180. As a result, the floating rotating body contact member 180 can slide in the axial direction relative to the rotation transmitting axle 144. When moving in the rotational direction of the rotation transmitting axle 144, the rotation of the floating rotating body contact member 180 is transmitted to the rotation transmitting axle 144 due to the contact between the notches 184 and the rotation transmitting ribs 146.

In the vibration actuator 100 with the above configuration, when the drive voltage is applied to the electromechanical transducer elements 132, 134 (not shown), 136, and 138 (not shown) to vibrate the vibrating body 300, the drive surfaces 125 and 126 move horizontally. The floating rotating body contact member 180 is pressed by the moving drive surface 125 to move in the axial direction against the bias of the biasing member 152. Furthermore, in response to the vibration, the location at which the drive surface 125 presses the drive receiving portion 181 moves along the perimeter of the floating rotating body contact member 180. As a result, the floating rotating body contact member 180 is rotationally driven.

In the same way, when the vibrating body 300 vibrates, the integrated rotating body contact member 142 pressed by the moving drive surface 126 moves in the axial direction against the bias of the biasing member 154. Furthermore, in response to the vibration, the location at which the drive surface 126 presses the drive receiving portion 141 moves along the perimeter of the integrated rotating body contact member 142. As a result, the integrated rotating body contact member 142 is rotationally driven. The rotation transmitting axle 144 of the rotating body 140 transmits the rotation of both the floating rotating body contact member 180 and the integrated rotating body contact member 142 that are rotationally driven by the vibration.

Figure 8:
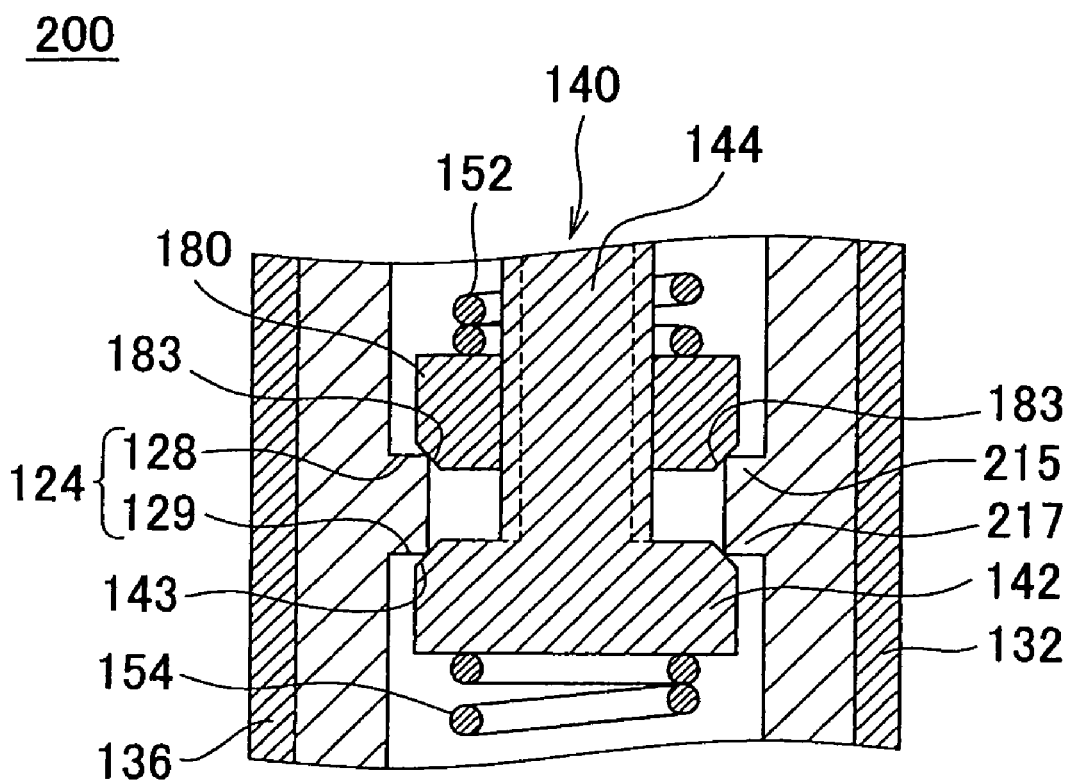
FIG. 8 is a partial cross-sectional diagram of another configuration of the work section 200.

FIG. 8 is a partial cross-sectional diagram of another configuration of the work section 200 in the vibration actuator 100. Aside from the portion described below, the configuration and operation of the vibration actuator 100 is the same as those of the vibration actuator 100 described in FIG. 6, and redundant descriptions are omitted.

In this work section 200, the integrated rotating body contact member 142 includes a slanted drive receiving surface 143 at the top edge thereof. The floating rotating body contact member 180 includes a slanted drive receiving surface 183 at the bottom edge thereof. The drive receiving surfaces 143 and 183 are respectively formed as ring-shaped truncated cones along the outer surfaces of the integrated rotating body contact member 142 and the floating rotating body contact member 180.

The small-diameter portion 124 of the elastic body 120 includes the second elastic body contact member 217 having a horizontal drive surface 129 formed on the bottom thereof and the first elastic body contact member 215 having a horizontal drive surface 128 formed on the top thereof. The drive surfaces 129 and 128 are each shaped as rings along the inner surface of the elastic body 120.

The integrated rotating body contact member 142 is biased upward by the biasing member 152. Therefore, the drive receiving surface 143 presses the inner edge of the drive surface 129. Accordingly, the horizontal movement of the drive surface 129 caused by the vibration of the elastic body 120 is transmitted to the integrated rotating body contact member 142 via the slanted drive receiving surface 143.

In the same way, the floating rotating body contact member 180 is biased downward by the biasing member 154. As a result, the drive receiving surface 183 presses the inner edge of the drive surface 128. Accordingly, the horizontal movement of the drive surface 128 caused by the vibration of the elastic body 120 is transmitted to the floating rotating body contact member 180 via the slanted drive receiving surface 183.

When the horizontal movement of the drive receiving surfaces 143 and 183 is transferred, the integrated rotating body contact member 142 and the floating rotating body contact member 180 move in the axial direction against the bias of the biasing members 152 and 154. Accordingly, the drive surfaces 129 and 128 and the drive receiving surfaces 143 and 183 have partial contact points on their circumferences. Furthermore, these contact points rotate along the circumferences of the integrated rotating body contact member 142 and the floating rotating body contact member 180 according to the vibration of the elastic body 120, thereby rotating the rotating body 140.

Figure 9:
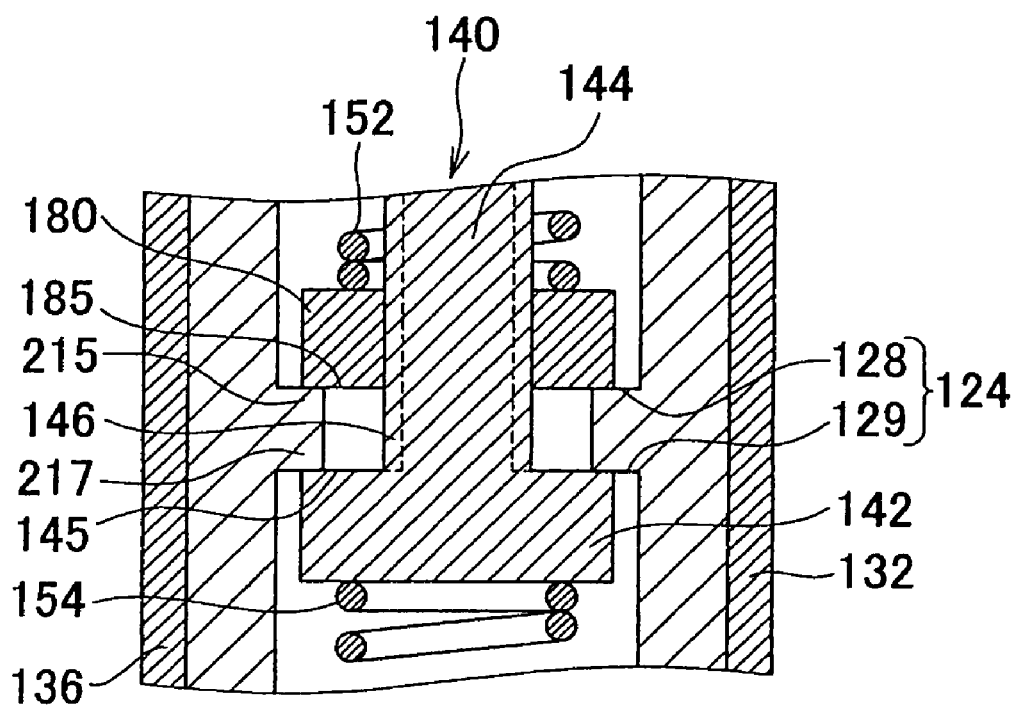
FIG. 9 is a partial cross-sectional diagram of yet another configuration of the work section 200.

FIG. 9 is a partial cross-sectional diagram of yet, another configuration of the work section 200 in the vibration actuator 100. Aside from the portion described below, the configuration and operation of the vibration actuator 100 is the same as those of the vibration actuator 100 described in FIG. 6, and redundant descriptions are omitted.

In this work section 200, the integrated rotating body contact member 142 includes a horizontal drive receiving surface 145 at the top edge thereof. The floating rotating body contact member 180 includes a horizontal drive receiving surface 185 at the bottom edge thereof. The small-diameter portion 124 of the elastic body 120 includes the second elastic body contact member 217 having a horizontal drive surface 129 on the bottom surface thereof and the first elastic body contact member 215 having a horizontal drive surface 128 on the top surface thereof.

The integrated rotating body contact member 142 is biased upward by the biasing member 152. Therefore, the drive receiving surface 145 presses the drive surface 129. The floating rotating body contact member 180 is biased downward by the biasing member 154. As a result, the drive receiving surface 185 presses the drive surface 128.

The drive surfaces 129 and 128 are in surface contact with the drive receiving surfaces 145 and 185. In this state, when the elastic body 120 vibrates, the drive surfaces 129 and 128 operate to move in a circle on the drive receiving surfaces 145 and 185, thereby rotating the integrated rotating body contact member 142 and the floating rotating body contact member 180.

The work section 200 with the configuration described above has no slanted surfaces, and can therefore be designed and manufactured easily. In this work section 200, the drive receiving surfaces 145 and 185 are in surface contact with the drive surfaces 129 and 128, and so the friction caused by the operation of the vibration actuator 100 is reduced, thereby enabling reliable operation over a long period of time.

In the vibration actuators 100 described above, the radius in the axial direction of each portion of the integrated rotating body contact member 142 and the floating rotating body contact member 180 is greater than the radius of the rotation transmitting axle 144. As a result, the gap between the portion at which the integrated rotating body contact member 142 contacts the elastic body 120 and the rotational axis of the rotating body 140 is greater than the radius of the rotation transmitting axle 144, and so the vibration actuator 100 can generate a large rotational torque. Accordingly, the vibration actuator 100 can be used to generate favorable drive in an optical system, such as an image capturing device or binoculars, or in a focusing mechanism, a zoom mechanism, or blur correcting mechanism, for example. Use of the vibration actuator 100 is not limited to these devices, however.

Second Embodiment

FIG. 10 is an exploded perspective view of a vibration actuator 100 according to an embodiment of the present invention. In the following description, each component has top and bottom ends in the axial direction, with the same orientation as shown in FIG. 10. However, this does not mean that the use of the vibration actuator 100 is limited to the direction shown in FIG. 10.

The vibration actuator 100 includes an elastic body 120, an electromechanical transducer 130 that causes the elastic body 120 to vibrate, a rotating body 140 that contacts the elastic body 120 at a plurality of positions to be rotationally driven thereby, and a biasing unit 150 that includes biasing members 152 and 154 that bias the rotating body 140 toward the elastic body 120. The vibration actuator 100 also includes position setting components 160 and 110 that fix the positions of the ends of the biasing members 152 and 154, a floating rotating body contact member 180 that is a portion of the rotating body 140, and an output gear 170 that transmits the rotation of the rotating body 140 to the outside.

The rotating body 140 includes a cylindrical rotation transmitting axle 144, a cylindrical integrated rotating body contact member 142 formed integrally with the rotation transmitting axle 144 at the bottom of the rotation transmitting axle 144 in the axial direction, and rotation transmitting ribs 146 formed at the top of the rotation transmitting axle 144 in the axial direction.

The outer diameter of the integrated rotating body contact member 142 is greater than the outer diameter of the rotation transmitting axle 144, and serves as one of a first rotating body contact member and a second rotating body contact member. The rotation transmitting ribs 146 protrude radially outward from the circumferential surface of the rotation transmitting axle 144 and extend to the top end of the rotation transmitting axle 144.

The floating rotating body contact member 180 has an outer diameter larger than the outer diameter of the rotation transmitting axle 144, in the same manner as the integrated rotating body contact member 142, and serves as the other of the first rotating body contact member and the second rotating body contact member. The floating rotating body contact member 180 is also cylindrical, and includes an insertion hole 182 through which the rotation transmitting axle 144 is inserted and notches 184 through which the rotation transmitting ribs 146 are inserted.

The elastic body 120 is a cylinder that is shorter than the total length of the rotation transmitting axle 144, and has a through hole extending longitudinally therethrough. The through hole has a circular cross section and has an inner diameter at an upper end thereof that is greater than the outer diameter of the floating rotating body contact member 180. The elastic body 120 has a groove portion 222 on the outer circumferential surface of the top end and a groove portion 122 on the outer circumferential surface of the bottom end. The elastic body 120 can be made of various metals, plastics, or ceramics.

The electromechanical transducer 130 includes electromechanical transducer elements 132, 134, 136, and 138 that have dimensions allowing arrangement at three or more, preferably four or more, regions on the outer circumferential surface of the elastic body 120. Each of the electromechanical transducer elements 132, 134, 136, and 138 has substantially the same dimensions, and is formed as a rectangle whose length is along the longitudinal direction of the elastic body 120 and curved to wrap partially around the outer surface of the elastic body 120.

The electromechanical transducer elements 132, 134, 136, and 138 include piezoelectric materials that expand when a drive voltage is applied thereto. Examples of such piezoelectric materials include lead zirconate titanate, crystal, lithium niobate, barium titanate, lead titanate, lead metaniobate, polyvinylidene difluoride, lead zinc niobate, lead scandium niobate, and the like.

Many piezoelectric materials are fragile, and so these materials are desirably reinforced with a highly elastic metal such as phosphor bronze. Instead, the elastic body 120 itself may serve as a support structure and the electromechanical transducer elements 132, 134, 136, and 138 may be formed by creating a piezoelectric material layer on the surface of the elastic body 120. The electrodes used when applying the drive voltage to the piezoelectric material may be made of nickel, gold, or the like and formed directly on the surface of the dielectric material using techniques such as plating, sputtering, vapor deposition, or thin film printing.

The biasing member 152 on the top has an inner diameter that is larger than the outer diameter of the rotation transmitting axle 144 including the rotation transmitting ribs 146, and has an outer diameter that is smaller than the outer diameter of the floating rotating body contact member 180. The biasing member 154 on the bottom has an inner diameter that is larger than the outer diameter of the rotation transmitting axle 144, and has an outer diameter that is smaller than the outer diameter of the integrated rotating body contact member 142. In the present embodiment, the biasing members 152 and 154 are coil springs, but other types of springs may be used instead.

The position setting component 110 below the elastic body 120 includes a short cylindrical portion 116 and a circular plate portion 113 that seals the bottom end of the cylindrical portion 116. The cylindrical portion 116 has a threaded portion 112 on the inner surface thereof. The circular plate portion 113 has an insertion hole 118 in the center thereof. The inner diameter of the insertion hole 118 is larger than the outer diameter of the rotation transmitting axle 144.

The position setting component 160 above the elastic body 120 includes a short cylindrical portion 166 and a circular plate portion 163 that seals the top of the cylindrical portion 166. The circular plate portion 163 has an insertion hole 168 in the center thereof. The inner diameter of the insertion hole 168 is larger than the outer diameter of the entire rotation transmitting axle 144 including the rotation transmitting rib 146.

The output gear 170 has an axle hole 172 in the center thereof. Notches 174 extend radially through a portion of the axle hole 172. The axle hole 172 has an inner diameter that accommodates the rotation transmitting axle 144. The notches 174 have shapes that are complementary to the rotation transmitting ribs 146.

With reference to FIG. 7 again, when the rotation transmitting axle 144 is inserted to the insertion hole 182 of the floating rotating body contact member 180, the rotation transmitting ribs 146 are inserted through the notches 184. As a result, the floating rotating body contact member 180 can slide in the axial direction relative to the rotation transmitting axle 144.

When moving in the rotational direction of the rotation transmitting axle 144, the rotation of the floating rotating body contact member 180 is transmitted to the rotation transmitting axle 144 due to the contact between the notches 184 and the rotation transmitting ribs 146. In the embodiment shown in FIG. 10, the rotation transmitting ribs 146 extend to the axial end of the rotation transmitting axle 144 so that the notches 174 of the output gear 170 also interlock with the rotation transmitting ribs 146 to transmit the rotation. It should be noted that the output gear 170 is interlocked with the rotation transmitting axle 144, and therefore does not move in the axial direction.

FIG. 11 is a vertical cross-sectional view of the vibration actuator 100. Components that are the same as those shown in FIG. 10 are given the same reference numerals, and redundant descriptions are omitted.

The electromechanical transducer 130 including the electromechanical transducer elements 132, 134 (not shown), 136, and 138 (not shown) is affixed on the outer surface of the elastic body 120 to form the vibrating body 300. As a result, when the drive voltage is applied to expand one of the electromechanical transducer elements 132, 134, 136, and 138, the portion of the elastic body 120 affixed to this one of the electromechanical transducer elements 132, 134, 136, and 138 also expands.

The elastic body 120 has a through hole with a large inner diameter at both ends thereof and a small inner diameter in the central region thereof. A first elastic body contact member 215 having a drive surface 121 slanted toward the bottom end of the elastic body 120 is formed at the border between the large diameter portion at the bottom end of the through hole and the small diameter portion. A second elastic body contact member 217 having a drive surface 123 slanted toward the top end of the elastic body 120 is formed at the border between the large diameter portion at the top end of the elastic body 120 and the small diameter portion. The drive surfaces 121 and 123 are formed as bowl-shaped rings continuous along the inner circumference of the through hole.

The inner diameters of the large diameter portions of the elastic body 120 are respectively larger than the outer diameters of the floating rotating body contact member 180 and the integrated rotating body contact member 142. The inner diameter of the small diameter portion is smaller than the outer diameter of the floating rotating body contact member 180 and the outer diameter of the integrated rotating body contact member 142. As a result, in the elastic body 120, the floating rotating body contact member 180 and the integrated rotating body contact member 142 are locked in position by the drive surfaces 121 and 123.

The position setting components 160 and 110 are fixed at the ends of the elastic body 120 as a result of the threaded portions 162 and 112 threading with the groove portions 222 and 122. In the fixed position setting components 160 and 110, the inner edges of the circular plate portions 163 and 113 contact the ends of the elastic body 120 to fix the positions of the position setting components 160 and 110. The inner edges of the circular plate portions 163 and 113 protrude inward in the through hole. The fixing of the position setting components 160 and 110 may be achieved by other methods such as adhesion, interlocking, or the like.

The rotation transmitting axle 144 is inserted to the through hole of the elastic body 120, and passes through the insertion holes 168 and 118 to extend beyond the position setting components 160 and 110. The rotation transmitting axle 144 extends further outward on the top side, so that the output gear 170 can be attached on the top end. By extending the rotation transmitting axle 144 further downward, output gears 170 can be attached to both ends of the rotating axle 144.

The integrated rotating body contact member 142 follows the rotation transmitting axle 144 inserted from above through the through hole of the elastic body 120 to be housed in the through hole. The floating rotating body contact member 180 is also housed in the through hole, and the rotation transmitting axle 144 and rotation transmitting rib 146 pass through the floating rotating body contact member 180. The integrated rotating body contact member 142, the rotation transmitting axle 144, the rotation transmitting rib 146, and the floating rotating body contact member 180 form the rotating body 140, and rotate integrally with the elastic body 120.

When the biasing member 152 is inserted in the top end of the rotation transmitting axle 144, the top end of the biasing member 152 contacts the circular plate portion 163 of the position setting component 160 and the bottom end of the biasing member 152 contacts the top surface of the floating rotating body contact member 180. The biasing member 152 is compressed between the floating rotating body contact member 180 and the position setting component 160. As a result, the biasing member 152 biases the floating rotating body contact member 180 downward.

When the biasing member 154 is inserted in the bottom end of the rotation transmitting axle 144, the bottom end of the biasing member 154 contacts the circular plate portion 113 of the position setting component 110 and the top end of the biasing member 154 contacts the bottom surface of the integrated rotating body contact member 142. The biasing member 154 is compressed between the integrated rotating body contact member 142 and the circular plate portion 113. As a result, the biasing member 154 biases the integrated rotating body contact member 142 upward. In this way, the biasing unit 150 is formed by the biasing members 152 and 154.

The biased integrated rotating body contact member 142 is locked in place by the drive receiving portion 141 at the top edge thereof contacting the drive surface 121. The biased floating rotating body contact member 180 is locked in place by the drive receiving portion 181 at the bottom edge thereof contacting the drive surface 123. The drive surfaces 121 and 123 and the drive receiving portions 141 and 181 form the work sections 200 that rotationally drive the rotating body 140 with the vibration of the vibrating body 300, as described further below.

The integrated rotating body contact member 142 and the floating rotating body contact member 180 rotate integrally as a portion of the rotating body 140. Therefore, at least one end of each of the biasing member 152 and the biasing member 154 slides relative to the component it contacts. Wear caused by the operation of the vibration actuator 100 can be decreased by decreasing the friction in this sliding. More specifically, a lubricant may be applied to the sliding components.

In the embodiment described above, the compressed biasing members 152 and 154 bias the integrated rotating body contact member 142 and the floating rotating body contact member 180. However, the configuration of the biasing member 152 is not limited to this. For example, the biasing member 152 may be engaged with the integrated rotating body contact member 142 and the floating rotating body contact member 180 in an expanded state to bias the integrated rotating body contact member 142 and the floating rotating body contact member 180 toward each other. A vibration actuator 100 using this type of spring does not include the position setting components 110 and 160.

FIG. 12 is a schematic diagram showing the behavior of the vibrating body 300 when the vibration actuator 100 operates. In the present embodiment, the vibrating body 300 is supported in the center from the outside, but may instead be supported at other positions.

Figures 12A, 12B:
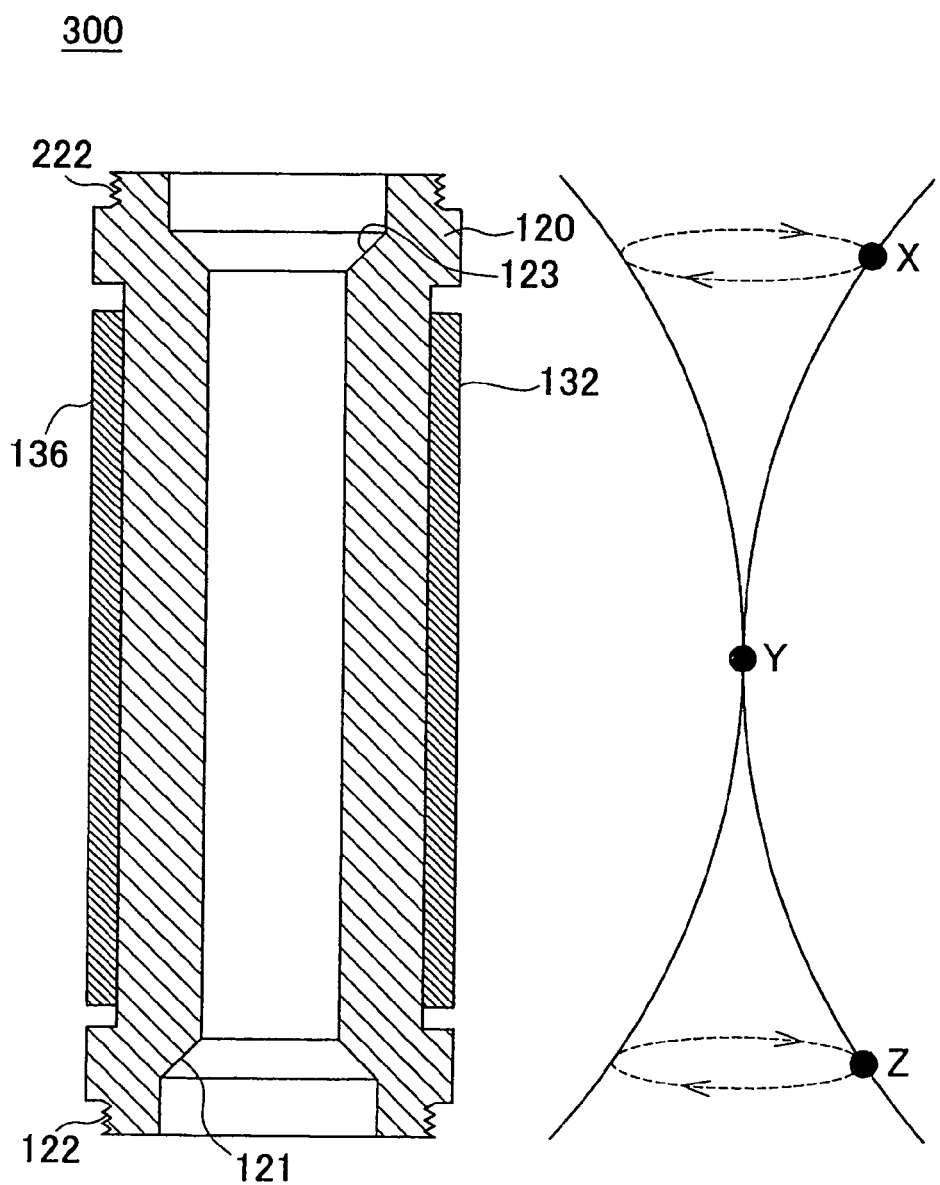
FIGS. 12A and 12B are schematic diagrams showing the operation of the vibration actuator 100.

In the vibrating body 300 of FIG. 12A, the electromechanical transducer elements 132, 134, 136, and 138 (not shown) expand in the longitudinal direction of the elastic body 120 when the drive voltage is applied. When one of the electromechanical transducer elements 132, 134, 136, and 138 expands, the portion of the elastic body 120 contacting this electromechanical transducer element 132, 134, 136, or 138 also expands, thereby bending the elastic body 120.

When the drive voltage is applied to the each of the electromechanical transducer elements 132, 134, 136, and 138 sequentially in a direction of the circumference of the elastic body 120, the curve of the elastic body 120 sequentially changes. When an AC electric field with a phase sequentially delayed by n/2 is applied to each of the electromechanical transducer elements 132, 134, 136, and 138, the vibrating body 300 vibrates in a circular motion orthogonal to the plane of FIG. 12A.

The vibrating body 300 is supported from the outside at the center, and so when vibrating, forms antinodes X and Y that are circles orthogonal to the plane of FIG. 12B at both ends. Therefore, by having the integrated rotating body contact member 142 and the floating rotating body contact member 180 contact the vibrating body 300 at the locations shown by the vibrational antinodes X and Y, the rotating body 140 can be efficiently rotated.

More specifically, in the bottom end of the vibrating body 300, the drive receiving portion 141 of the integrated rotating body contact member 142 is biased by the biasing member 154 to press against the drive surface 121. The drive surface 121 moves horizontally due to the vibration of the vibrating body 300. When the slanted drive surface 121 moves horizontally, the integrated rotating body contact member 142 is pressed via the drive receiving portion 141 to move in the axial direction against the bias of the biasing member 154. As a result, a gap occurs between the drive surface 121 and the drive receiving portion 141.

During the vibration, the direction in which the drive surface 121 moves sequentially rotates in the circumferential direction of the rotating body 140. Accordingly, the position at which the gap described above occurs also moves in the circumferential direction. As a result, friction for rotating the integrated rotating body contact member 142 occurs between the drive receiving portion 141 and the drive surface 121. The rotation of the integrated rotating body contact member 142 caused by this friction is transmitted to the outside via the rotation transmitting axle 144 and the output gear 170.

In the same way, in the top end of the vibrating body 300, the drive receiving portion 181 is biased by the biasing member 152 to press against the drive surface 123. The drive surface 123 moves horizontally due to the vibration of the vibrating body 300. When the slanted drive surface 123 moves horizontally, the floating rotating body contact member 180 is pressed via the drive receiving portion 181 to move in the axial direction against the bias of the biasing member 152.

As a result, a gap occurs between the drive surface 123 and the drive receiving portion 181. In the same way as the integrated rotating body contact member 142, the floating rotating body contact member 180 is driven by friction. The rotation of the floating rotating body contact member 180 is in the same direction as the rotation of the integrated rotating body contact member 142, and so the integrated rotating body contact member 142 and the floating rotating body contact member 180 work together to efficiently rotate the rotating body 140.

In the vibration actuator 100, the drive surfaces 121 and 123 and the drive receiving portions 141 and 181 are kept in contact by the biases of the biasing members 154 and 152. Accordingly, even if the dimensions of the components change due to a change in temperature or the like, the contact between the drive surfaces 121 and 123 and the drive receiving portions 141 and 181 is unaffected. Furthermore, the bias direction of the biasing members 152 and 154 is different from the direction of the load of the vibration actuator 100, and so even if the load of the vibration actuator 100 changes, the contact between the drive surfaces 121 and 123 and the drive receiving portions 141 and 181 is unaffected.

The gap between the inner surface of the elastic body 120 and the surface of the rotating body 140 at each point in the radial direction, aside from the regions of the integrated rotating body contact member 142 and the floating rotating body contact member 180, is greater than the amplitude of the vibration of the vibrating body 300 at that point. Therefore, undesired drive due to components other than the integrated rotating body contact member 142 and the floating rotating body contact member 180 contacting the vibrating body 300 is prevented.

The frequency of the drive voltage applied to the electromechanical transducer 130 desirably includes a resonance frequency corresponding to the characteristic frequency of the vibrating body 300. Therefore, the vibrating body 300 is efficiently vibrated by the drive power provided thereto, and this vibration can be continued.

The present embodiment uses an electromechanical transducer 130 that includes four electromechanical transducer elements 132, 134, 136, and 138 arranged at uniform intervals, but the configuration of the electromechanical transducer 130 is not limited to this. The vibrating body 300 can achieve vibration using an electromechanical transducer 130 that includes three or more of the electromechanical transducer elements arranged around the circumference of the elastic body 120.

In the work sections 200, the drive receiving portions 141 and 181 and the drive surfaces 121 and 123 repeatedly contact and separate from each other. Accordingly, at least the surfaces of the drive receiving portions 141 and 181 and the drive surfaces 121 and 123 can be formed of a material with high abrasion resistance, such as ceramic. As a result, the lifespan of the vibration actuator 100 can be increased.

FIG. 13 is a cross-sectional view of the vibration actuator 100 including another configuration of the work sections 200. Aside from the portion described below, the configuration and operation of the vibration actuator 100 is the same as those of the vibration actuator 100 described in FIG. 11, and redundant descriptions are omitted.

In the work section 200 in the bottom end of the vibration actuator 100, the integrated rotating body contact member 142 includes a slanted drive receiving surface 143 at the top edge thereof. The slanted drive receiving surface 143 is formed as a ring-shaped truncated cone along the outer surface of the integrated rotating body contact member 142. The through hole of the elastic body 120 has a first elastic body contact member 215 that forms a horizontal drive surface 125 facing downward at a border between the bottom portion of the elastic body 120 with a large internal diameter and the portion with a small internal diameter.

In the same way, in the work section 200 in the top end of the elastic body 120, the floating rotating body contact member 180 includes a slanted drive receiving surface 183 at the bottom edge thereof. The slanted drive receiving surface 183 is formed as a ring-shaped inverted truncated cone along the outer surface of the floating rotating body contact member 180. The through hole of the elastic body 120 has a second elastic body contact member 217 that forms a horizontal drive surface 129 facing upward at a border between the top portion of the elastic body 120 with a large internal diameter and the portion with a small internal diameter.

The integrated rotating body contact member 142 is biased upward by the biasing member 154. Accordingly, the drive receiving surface 143 presses against the inner surface edge of the drive surface 125. The horizontal movement of the drive surface 125 caused by the vibration of the elastic body 120 is transmitted to the integrated rotating body contact member 142 via the slanted drive receiving surface 143.

When the horizontal movement of the drive surface 125 is transmitted to the drive receiving surface 143, the integrated rotating body contact member 142 moves in the axial direction against the bias of the biasing member 152. Accordingly, a gap occurs between the drive surface 125 and the drive receiving surface 143. The position of this gap rotates along the circumference of the integrated rotating body contact member 142 according to the vibration of the vibrating body 300.

In the same way, the floating rotating body contact member 180 is biased downward by the biasing member 152. Accordingly, the drive receiving surface 183 presses against the inner surface edge of the drive surface 129. The horizontal movement of the drive surface 129 caused by the vibration of the elastic body 120 is transmitted to the floating rotating body contact member 180 via the slanted drive receiving surface 183.

When the horizontal movement of the drive surface 129 is transmitted to the drive receiving surface 183, the floating rotating body contact member 180 moves in the axial direction against the bias of the biasing member 152. Accordingly, a gap occurs between the drive surface 125 and the drive receiving surface 183. The position of this gap rotates along the circumference of the floating rotating body contact member 180 according to the vibration of the vibrating body 300.

In the same way as the vibration actuator 100 shown in FIG. 11, the rotating body 140 is rotationally driven at two locations by the integrated rotating body contact member 142 and the floating rotating body contact member 180. The rotation of the rotating body 140 is transmitted to the outside via the output gear 170.

FIG. 14 is a cross-sectional view of a modification of the vibration actuator 100 according to the present embodiment. Components that are the same as those in the other embodiments are given the same reference numerals. Aside from the portion described below, the configuration and operation of the vibration actuator 100 is the same as those of the vibration actuators 100 shown in other Figures, and redundant descriptions are omitted.

This vibration actuator 100 also includes a vibrating body 300 having electromechanical transducer elements 132, 134 (not shown), 136, and 138 (not shown) and a rotating body 140 having a rotation transmitting axle 144, an integrated rotating body contact member 142, a rotation transmitting rib 146, and a floating rotating body contact member 180.

In this vibrating body 300, the elastic body 120 has a first elastic body contact member 215 and a second elastic body contact member 217 forming slanted drive surfaces 121 and 123 at the ends of a through hole. The slanted drive surfaces 121 and 123 are continuous along the circumference of the inner surface of the through hole, and are ring-shaped bowls that are widest at the ends of the elastic body 120. Except for the drive surfaces 121 and 123, the inner diameter of the through hole is constant.

The rotating body 140 includes the rotation transmitting axle 144 inserted longitudinally through the through hole inside the elastic body 120. The rotation transmitting axle 144 has the rotation transmitting rib 146 on the bottom thereof, and the rotation transmitting rib 146 protrudes radially outward from the circumferential surface and extends to the bottom end of the rotation transmitting axle 144.

The rotating body 140 has a cylindrical integrated rotating body contact member 142 at the top end of the rotation transmitting axle 144. The outer diameter of the integrated rotating body contact member 142 is larger than the usual inner diameter of the through hole and is smaller than the widest inner diameter of the drive surface 121. Accordingly, the drive receiving portion 141 at the bottom edge of the integrated rotating body contact member 142 contacts the drive surface 121.

The rotating body 140 has a cylindrical floating rotating body contact member 180 at the bottom end of the rotation transmitting axle 144. The outer diameter of the floating rotating body contact member 180 is larger than the usual inner diameter of the through hole and is smaller than the widest inner diameter of the drive surface 123. Accordingly, the drive receiving portion 181 of the floating rotating body contact member 180 contacts the drive surface 123.

The floating rotating body contact member 180 can slide in the axial direction along the rotation transmitting axle 144. The floating rotating body contact member 180 has a notch 184 that engages with the rotation transmitting rib 146 to rotate integrally with the rotation transmitting axle 144. The top edge of the floating rotating body contact member 180 is a drive receiving portion 181 that contacts the drive surface 123.

The rotating body 140 includes a circular position setting component 110 at the bottom end of the rotation transmitting axle 144. The position setting component 110 has an outer diameter substantially the same as that of the floating rotating body contact member 180 and is fixed to the rotation transmitting axle 144 at least in the axial direction. The position setting component 110 has a circular plate portion 113 formed with depressions on the top end thereof, and determines the position of the bottom end of the biasing member 152. As a result, the biasing member 152 is compressed between the floating rotating body contact member 180 and the position setting component 110.

In this way, the drive receiving portion 181 is pressed against the drive surface 123 to be locked in position. The bias of the biasing member 152 also affects the integrated rotating body contact member 142 formed on the top end of the rotation transmitting axle 144. As a result, the drive receiving portion 141 is pressed against the drive surface 121 to lock the position. In this way, the biasing member 152 and the position setting component 110 work together to form the biasing unit 150.

When the drive surfaces 121 and 123 move horizontally due to the vibration of the vibrating body 300, the movement of the drive surfaces 121 and 123 is transmitted to the drive receiving portions 141 and 181. As a result, the drive receiving portions 141 and 181 move in the axial direction against the bias of the biasing member 152, and gaps occur between the drive surfaces 121 and 123 and the drive receiving portions 141 and 181. The positions of these gaps move along the circumference of the floating rotating body contact member 180 according to the vibration of the vibrating body 300.

Therefore, in the same manner as the other vibration actuators 100, the rotating body 140 is rotationally driven by the integrated rotating body contact member 142 and the floating rotating body contact member 180 at two locations. The rotation of the rotating body 140 is transmitted to the outside by the output gear 170.

The vibration actuator 100 has a unique configuration in which a single biasing member 152 is used by a pair of work sections 200, and this decreases the number of components. The integrated rotating body contact member 142 and the floating rotating body contact member 180 are biased with the same force, and so the drive forces generated at the ends of the elastic body 120 are automatically balanced. Furthermore, both ends of the biasing member 152 rotate with the rotating body 140, allowing easy sliding and less wear due to movement.

FIG. 15 is a partial cross-sectional view of another configuration of the work section 200 in the vibration actuator 100. Aside from the portion described below, the configuration and operation of the vibration actuator 100 is the same as those of the vibration actuator 100 described in FIG. 14, and redundant descriptions are omitted.

In this work section 200, the integrated rotating body contact member 142 includes a slanted drive receiving surface 143 at the bottom thereof. The floating rotating body contact member 180 includes a slanted drive receiving surface 183 at the top thereof. The drive receiving surfaces 143 and 183 are respectively formed as ring-shaped truncated cones along the outer surfaces of the integrated rotating body contact member 142 and the floating rotating body contact member 180.

The elastic body 120 has a through hole with a constant inner diameter. The first elastic body contact member 215 and the second elastic body contact member 217 are formed at the ends of the elastic body 120. Here, the portions of the drive receiving surfaces 143 and 183 with the largest diameter have diameters that are greater than the inner diameter of the through hole of the elastic body 120. Furthermore, the portions of the drive receiving surfaces 143 and 183 with the smallest diameter have diameters that are less than the inner diameter of the through hole of the elastic body 120.

In the vibration actuator 100, the drive surfaces 121 and 123 are in surface contact with the drive receiving surfaces 143 and 183 during driving, and so the friction between the drive surfaces 121 and 123 and the drive receiving surfaces 143 and 183 caused by the operation of the vibration actuator 100 is reduced, thereby enabling reliable operation over a long period of time.

Figure 16:
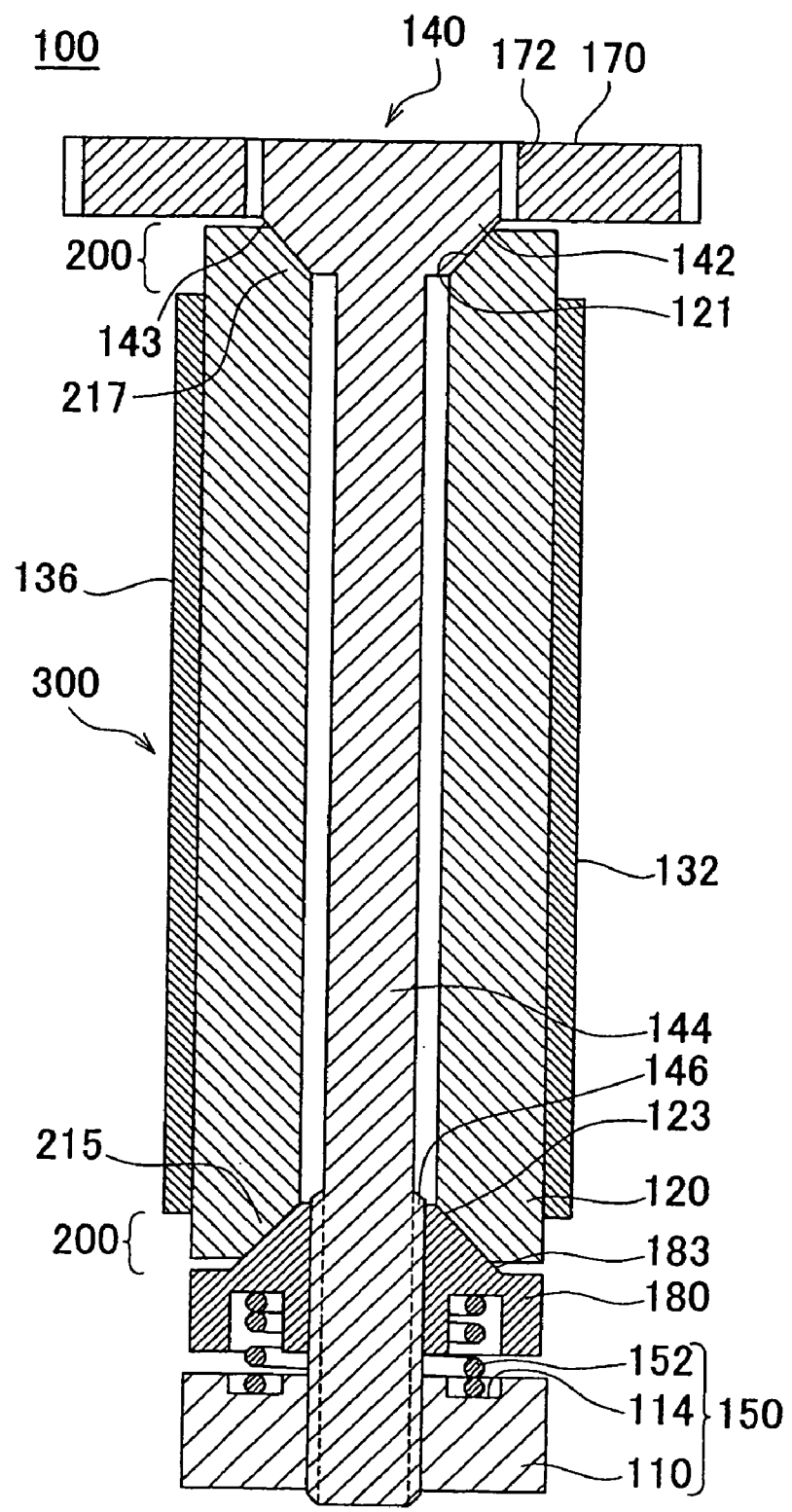
FIG. 16 is a vertical cross-sectional view of the vibration actuator 100 according to another embodiment.

In the embodiments of FIGS. 14, 15, and 16, the output gear 170 is supported on the top end of the rotation transmitting axle 144 along with the integrated rotating body contact member 142. However, the output gear 170 can instead be supported on the bottom end of the rotation transmitting axle 144, i.e. along with the position setting component 110. Furthermore, the output gear 170 can serve as the position setting component 110 to determine the position of the bottom end of the biasing member 152.

In the embodiments of FIGS. 14, 15, and 16, the integrated rotating body contact member 142 and the floating rotating body contact member 180 are both biased by the expansion force of the biasing member 152 compressed therebetween. However, the configuration of the biasing member 152 is not limited to this.

For example, the biasing member 152 may be engaged with the integrated rotating body contact member 142 and the floating rotating body contact member 180 in an extended state to bias the integrated rotating body contact member 142 and the floating rotating body contact member 180. With this configuration, the position setting component 110 on the bottom end of the rotation transmitting axle 144 is removed.

FIG. 17 is a vertical cross-sectional view of the vibration actuator 100 according to another embodiment of the present invention. Aside from the portion described below, the configuration and operation of the vibration actuator 100 is the same as those of the vibration actuator 100 described in other Figures, and therefore components common to this vibration actuator 100 are given the same reference numerals and redundant descriptions are omitted.

The through hole of the elastic body 120 has the same internal diameter at both ends thereof. The elastic body 120 has a small-diameter portion 124 with a smaller internal diameter formed in the approximate longitudinal center thereof. The small-diameter portion 124 is a portion of the inner surface of the through hole that protrudes further inward. The small-diameter portion 124 includes a first elastic body contact member 215 having a drive surface 121 that is slanted toward the bottom end of the elastic body 120 and a second elastic body contact member 217 having a drive surface 123 that is slanted toward the top end of the elastic body 120.

The elastic body 120 includes a position setting component 110 mounted on the bottom end thereof and a position setting component 160 mounted on the top end thereof. The position setting components 110 and 160 are mounted at both longitudinal ends of the elastic body 120 by threading the groove portions 122 and 222 formed on the inner surface of the elastic body 120 with the threaded portions 112 and 162. The mounted position setting components 110 and 160 are stopped at the ends of the elastic body 120 by the circular plate portions 113 and 163 contacting the end surfaces of the elastic body 120.

The position setting component 110 at the top end has an insertion hole 168 with an inner diameter substantially the same as the outer diameter of the rotation transmitting axle 144, and serves as a bearing that rotatably supports the rotation transmitting axle 144. The position setting component 110 on the bottom end does not have an insertion hole 118. The rotating body 140 has the integrated rotating body contact member 142 as the bottom end thereof, and so the bottom position setting component 110 does not support the rotating body 140.

The rotating body 140 includes a cylindrical integrated rotating body contact member 142, a rotation transmitting axle 144, and a rotation transmitting rib 146 formed integrally. The rotation transmitting axle 144 extends from the top surface of the integrated rotating body contact member 142 beyond the position setting component 160. The rotation transmitting rib 146 protrudes radially from the circumferential surface of the rotation transmitting axle 144 and extends in the axial direction. The integrated rotating body contact member 142 serves as a first rotating body contact member.

The rotating body 140 further includes a cylindrical floating rotating body contact member 180. The floating rotating body contact member 180 has the rotation transmitting axle 144 and the rotation transmitting rib 146 inserted therethrough, and can slide freely in the axial direction of the rotation transmitting axle 144. The floating rotating body contact member 180 contacts the drive surface 123 from above with the drive receiving portion 181 formed on the bottom edge thereof. In this way, the floating rotating body contact member 180 serves as a second rotating body contact member. Therefore, the drive surfaces 121 and 123 and the drive receiving portions 141 and 181 form a work section 200 that rotationally drives the rotating body 140 with the vibration of the vibrating body 300, which is described further below.

The vibration actuator 100 includes a biasing member 152 arranged between the position setting component 160 and the floating rotating body contact member 180 and a biasing member 154 arranged between the position setting component 110 and the integrated rotating body contact member 142. Each of the biasing members 152 and 154 are provided in a compressed state to form the biasing unit 150.

Accordingly, the biasing member 152 presses downward on the floating rotating body contact member 180. As a result, the drive receiving portion 181 at the bottom edge of the floating rotating body contact member 180 presses against the drive surface 123. In addition, the biasing member 154 presses upward on the integrated rotating body contact member 142. As a result, the drive receiving portion 141 at the top edge of the integrated rotating body contact member 142 presses against the drive surface 121.

Figure 18A:
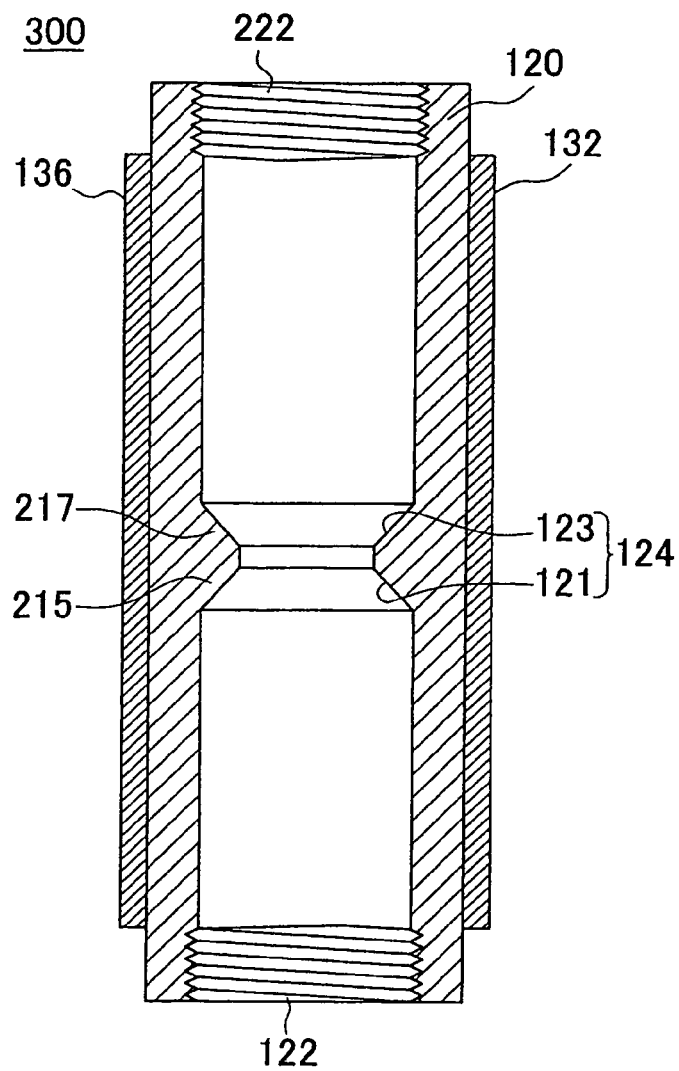
FIGS. 18A and 18B are schematic diagrams showing the operation of the vibration actuator 100.
Figure 18B:
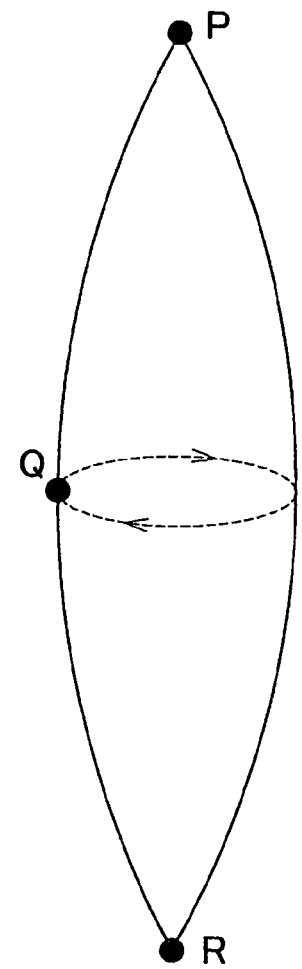

FIGS. 18A and 18B are schematic diagrams showing the behavior of the vibrating body 300 when the vibration actuator 100 shown in FIG. 17 operates. In the present embodiment, the vibrating body 300 is supported at both ends from the outside, but may instead be supported at other positions.

In the vibrating body 300 of FIG. 18A, the electromechanical transducer elements 132, 134 (not shown), 136, and 138 (not shown) expand in the longitudinal direction of the elastic body 120 when the drive voltage is applied, such that the elastic body 120 also expands longitudinally, in the same manner as the vibrating body 300 of FIG. 12A. Furthermore, when the drive voltage is applied to the each of the electromechanical transducer elements 132, 134, 136, and 138 sequentially in a direction of the circumference of the elastic body 120, the curve of the elastic body 120 sequentially changes to cause the vibrating body 300 to vibrate, in the same manner as the vibrating body 300 of FIG. 18A.

The horizontal movement of the vibrating body 300 during vibration is greatest at the approximate longitudinal center thereof. Therefore, by contacting the integrated rotating body contact member 142 at the portion of the vibrating body 300 shown by the antinode Q during vibration, the integrated rotating body contact member 142 is efficiently rotated circumferentially.

The integrated rotating body contact member 142 is biased upward by the biasing member 154. Accordingly, the drive receiving portion 141 is pressed against the drive surface 121. The horizontal movement of the elastic body 120 from the slanted drive surface 121 is transmitted to the integrated rotating body contact member 142 via the slanted drive receiving portion 141. When the horizontal movement is transmitted to the drive receiving portion 141, the integrated rotating body contact member 142 moves in the axial direction against the bias of the biasing member 154.

When the integrated rotating body contact member 142 moves in the axial direction, a gap occurs between the drive receiving portion 141 and the drive surface 121. Furthermore, the vibration causes the direction of movement of the drive surface 121 to rotate, which leads to friction between the drive receiving portion 141 and the drive surface 121 that rotates the integrated rotating body contact member 142.

The floating rotating body contact member 180 is biased downward by the biasing member 152. Accordingly, the drive receiving portion 181 is pressed against the drive surface 123. The horizontal movement of the slanted drive surface 123 caused by the elastic body 120 is transmitted to the floating rotating body contact member 180 via the slanted drive receiving portion 181. When the horizontal movement is transmitted to the drive receiving portion 181, the integrated rotating body contact member 142 moves in the axial direction against the bias of the biasing member 154.

When the floating rotating body contact member 180 moves in the axial direction, a gap occurs between the drive receiving portion 181 and the drive surface 123. The rotational direction of the floating rotating body contact member 180 is the same as that of the integrated rotating body contact member 142, and so the integrated rotating body contact member 142 and the floating rotating body contact member 180 work together to efficiently rotate the rotating body 140. The rotation of the rotating body 140 is transmitted to the outside via the rotation transmitting axle 144 and the output gear 170.

The frequency of the drive voltage applied to the electromechanical transducer 130 desirably includes a resonance frequency corresponding to the characteristic frequency of the vibrating body 300. Therefore, the vibrating body 300 is efficiently vibrated by the drive power provided thereto, and this vibration can be continued. The vibrating body 300 may have another vibration mode that uses a plurality of nodes and antinodes.

The present embodiment uses an electromechanical transducer 130 that includes four electromechanical transducer elements 132, 134, 136, and 138 arranged at uniform intervals, but the configuration of the electromechanical transducer 130 is not limited to this. The vibrating body 300 can achieve vibration using an electromechanical transducer 130 that includes three or more of the electromechanical transducer elements arranged around the circumference of the elastic body 120.

During operation of this vibration actuator 100, the drive receiving portions 141 and 181 and the drive surfaces 121 and 123 repeatedly contact and separate from each other. Accordingly, at least the surfaces of the drive receiving portions 141 and 181 and the drive surfaces 121 and 123 can be formed of a material with high abrasion resistance, such as ceramic. As a result, the lifespan of the vibration actuator 100 can be increased.

Figure 19:
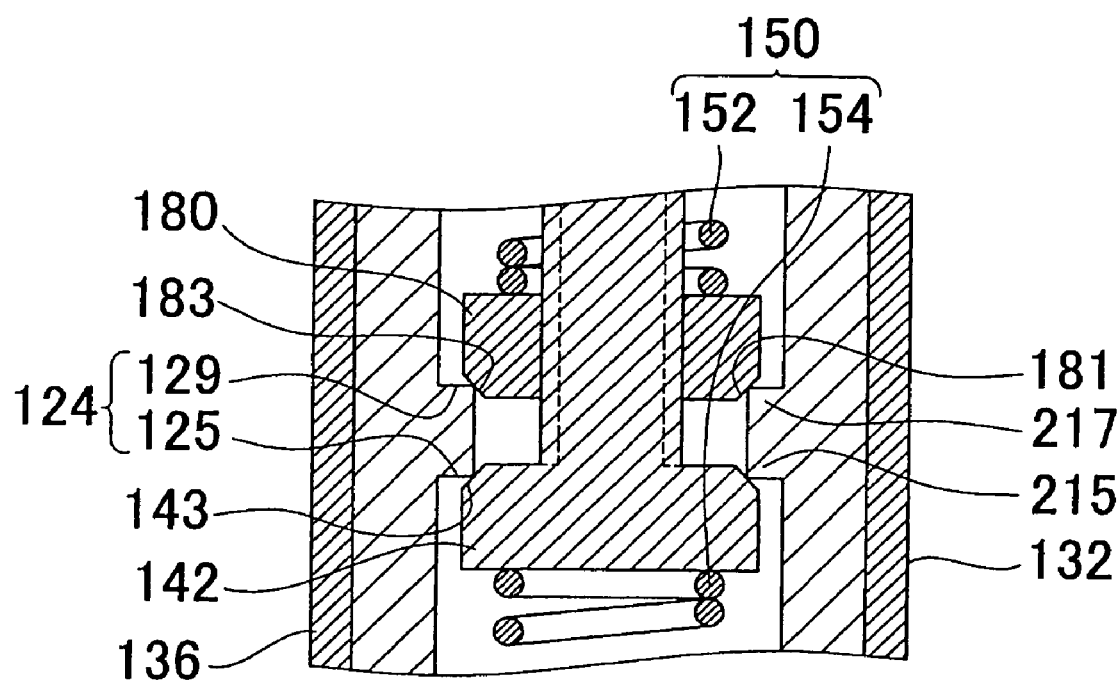
FIG. 19 is a partial cross-sectional view of another configuration of the work section 200.

FIG. 19 is a partial cross-sectional diagram of another configuration of the work section 200 in the vibration actuator 100. Aside from the portion described below, the configuration and operation of the vibration actuator 100 is the same as those of the vibration actuator 100 described in FIG. 17, and redundant descriptions are omitted.

In this work section 200, the integrated rotating body contact member 142 includes a slanted drive receiving surface 143 at the top edge thereof. The floating rotating body contact member 180 includes a slanted drive receiving surface 183 at the bottom edge thereof. The drive receiving surfaces 143 and 183 are respectively formed as ring-shaped truncated cones along the outer surfaces of the integrated rotating body contact member 142 and the floating rotating body contact member 180.

The small-diameter portion 124 of the elastic body 120 includes a first elastic body contact member 215 having a horizontal drive surface 125 formed on the bottom thereof and a second elastic body contact member 217 having a horizontal drive surface 129 formed on the top thereof. The drive surfaces 125 and 127 are each shaped as rings along the inner surface of the elastic body 120.

The integrated rotating body contact member 142 is biased upward by the biasing member 154. Therefore, the drive receiving surface 143 presses the inner edge of the drive surface 125. Accordingly, the horizontal movement of the drive surface 125 caused by the vibration of the elastic body 120 is transmitted to the integrated rotating body contact member 142 via the slanted drive receiving surface 143.

In the same way, the floating rotating body contact member 180 is biased downward by the biasing member 152. As a result, the drive receiving surface 183 presses the inner edge of the drive surface 129. Accordingly, the horizontal movement of the drive surface 129 caused by the vibration of the elastic body 120 is transmitted to the floating rotating body contact member 180 via the slanted drive receiving surface 183.

When the horizontal movement of the drive receiving surfaces 143 and 183 is transferred, the integrated rotating body contact member 142 and the floating rotating body contact member 180 move in the axial direction against the bias of the biasing members 154 and 152. Accordingly, a gap is formed between the drive surfaces 125 and 127 and the drive receiving surfaces 143 and 183. Furthermore, the position of this gap rotates along the circumferences of the integrated rotating body contact member 142 and the floating rotating body contact member 180 according to the motion of the drive surfaces 125 and 127 due to the vibration. In this way, friction occurs between the integrated rotating body contact member 142 and the floating rotating body contact member 180 to rotationally drive the rotating body 140.

Figure 20:
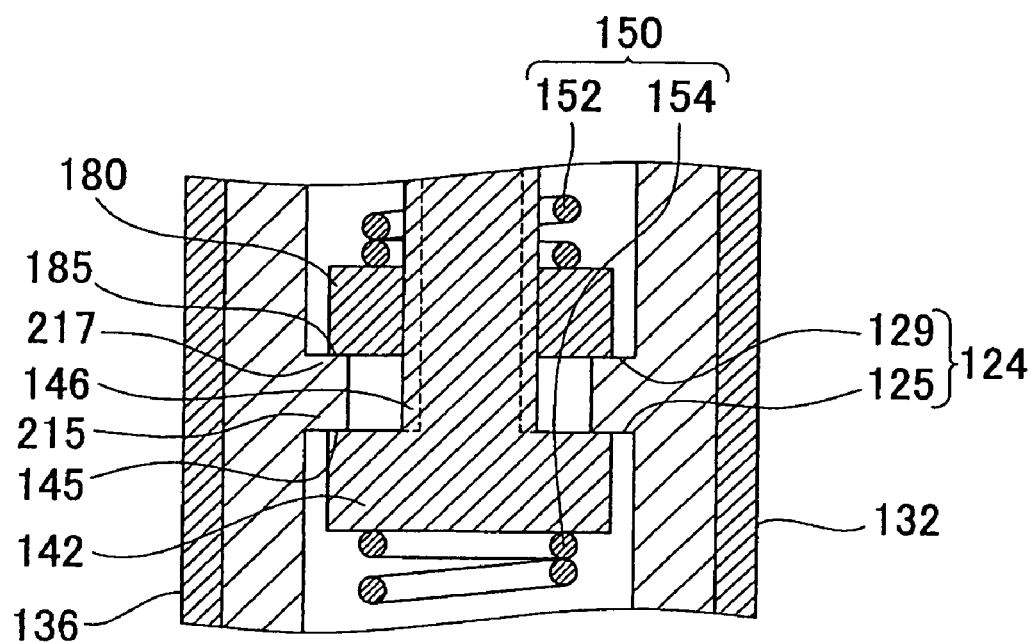
FIG. 20 is a partial cross-sectional view of another configuration of the work section 200.

FIG. 20 is a partial cross-sectional diagram of yet another configuration of the work section 200 in the vibration actuator 100. Aside from the portion described below, the configuration and operation of the vibration actuator 100 is the same as those of the vibration actuator 100 described in FIG. 17, and redundant descriptions are omitted.

In this work section 200, the integrated rotating body contact member 142 includes a horizontal drive receiving surface 145 on the top surface thereof. The floating rotating body contact member 180 includes a horizontal drive receiving surface 185 on the bottom surface thereof. The small-diameter portion 124 of the elastic body 120 includes the second elastic body contact member 217 having a horizontal drive surface 129 on the top surface thereof and the first elastic body contact member 215 having a horizontal drive surface 125 on the bottom surface thereof.

The integrated rotating body contact member 142 is biased upward by the biasing member 152. Therefore, the drive receiving surface 145 presses the drive surface 125. The floating rotating body contact member 180 is biased downward by the biasing member 154. As a result, the drive receiving surface 185 presses the drive surface 129.

The drive surfaces 125 and 127 are in surface contact with the drive receiving surfaces 145 and 185. When the elastic body 120 vibrates, the drive surfaces 125 and 127 operate to move in a circle on the drive receiving surfaces 145 and 185, thereby rotating the integrated rotating body contact member 142 and the floating rotating body contact member 180.

The work section 200 with the configuration described above has no slanted surfaces, and can therefore be designed and manufactured easily. In this work section 200, the drive receiving surfaces 145 and 185 are in surface contact with the drive surfaces 125 and 127, and so the friction caused by the operation of the vibration actuator 100 is reduced, thereby enabling reliable operation over a long period of time.

In the vibration actuators 100 described above, the outer diameter in the axial direction of each portion of the integrated rotating body contact member 142 and the floating rotating body contact member 180 is greater than the outer diameter of the rotation transmitting axle 144. As a result, the gap between the portion at which the integrated rotating body contact member 142 contacts the elastic body 120 and the rotational axis of the rotating body 140 is greater than the radius of the rotation transmitting axle 144, and so the vibration actuator 100 can generate a large rotational torque.

The vibration actuators 100 described above have the advantages of high response speed and high drive torque, and can also operate with little noise. Furthermore, these vibration actuators 100 have good energy efficiency and have a low number of components, allowing for further miniaturization. Accordingly, these vibration actuators 100 can be used to generate favorable drive in an optical system, such as an image capturing device or binoculars, or in a focusing mechanism, a zoom mechanism, or blur correcting mechanism, for example. Use of the vibration actuators 100 is not limited to these devices, however.

Third Embodiment

Figure 21:
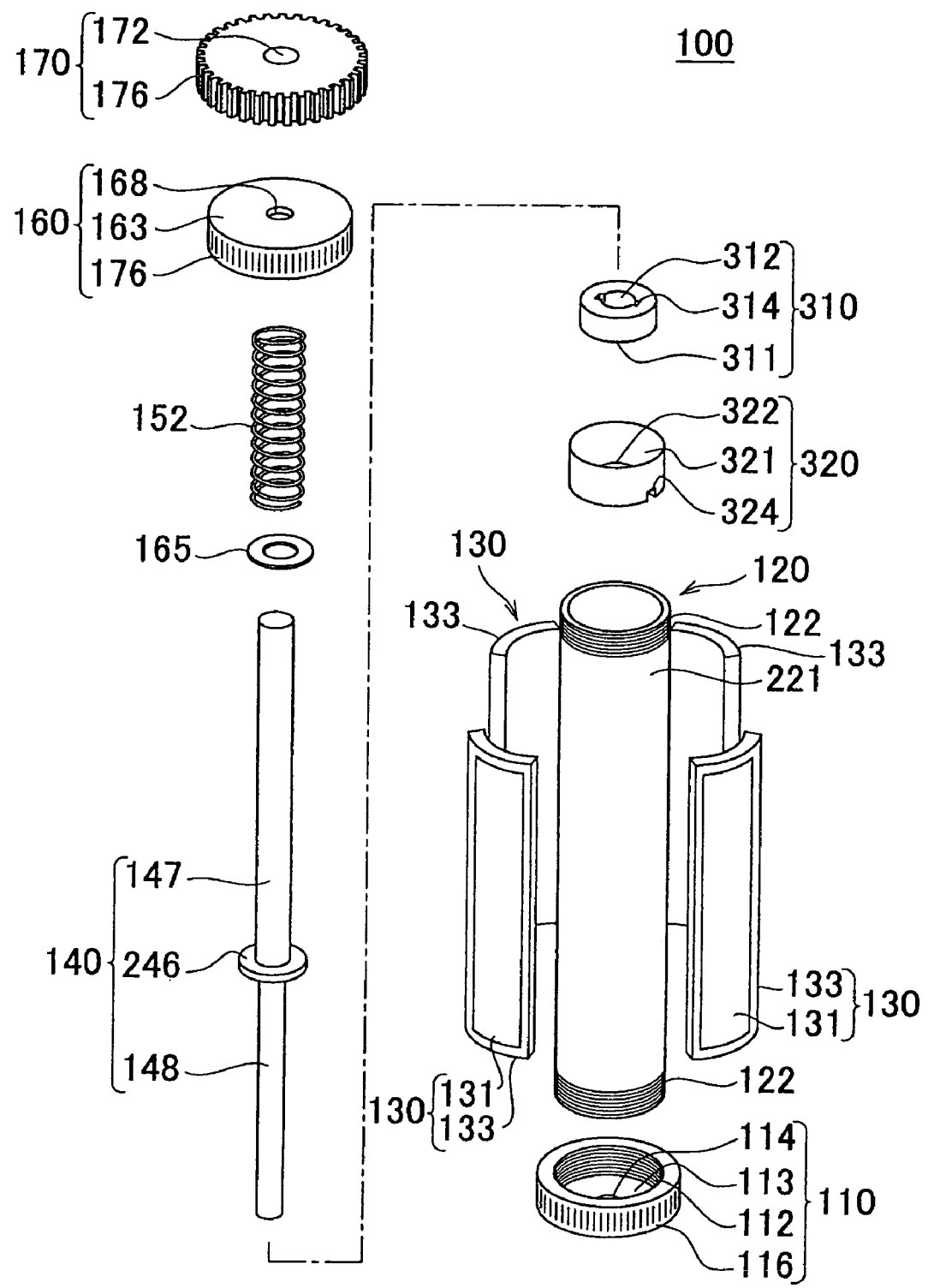
FIG. 21 is an exploded perspective view of a vibration actuator 100 according to an embodiment of the present invention.

FIG. 21 is an exploded perspective view of a vibration actuator 100 according to an embodiment of the present invention. In the following description, each component has top and bottom ends in the axial direction, with the same orientation as shown in FIG. 21. However, this does not mean that the use of the vibration actuator 100 is limited to the direction shown in FIG. 21.

The vibration actuator 100 includes a rotating body 140 serving as a rotor, an elastic body 120 that serves as a stator for rotating the rotating body 140 by vibrating, and an electromechanical transducer 130 that serves as a drive unit to vibrate the elastic body 120. The vibration actuator 100 includes a washer 165 provided on the rotating body 140, a biasing member 152 and a contact member 310, a position setting component 110 and a position setting component 160 provided on the elastic body 120, a contact member 320 that is housed in the elastic body 120, and an output gear 170 that is provided near the top end of the rotating body 140.

The position setting component 110 includes a circular plate portion 113 that covers the bottom end of the cylindrical portion 116, a bearing unit 114 formed in the center of the circular plate portion 113, and a threaded portion 112 formed on the inner surface of the cylindrical portion 116. The position setting component 160 includes a circular plate portion 163 that covers the top end of the cylindrical portion 166 and a bearing unit 164 formed in the center of the circular plate portion 163. Furthermore, a threaded portion 162 is formed on the inner surface of the cylindrical portion 166, which cannot be seen in FIG. 21.

The elastic body 120 includes an elastic cylindrical portion 221. The elastic body 120 includes groove portions 122 near the top and bottom ends on the outer surface of the cylindrical portion 221. The groove portions 122 have pitches and inner diameters that enable threading with the threaded portions 162 and 112.

The electromechanical transducer 130 includes four piezoelectric plates 133, and each piezoelectric plate 133 has an electrode 131 formed across almost the entire surface thereof. Each piezoelectric plate 133 has a curved surface corresponding to the outer circumferential surface of the cylindrical portion 221, and has an arc-shaped horizontal cross section.

The length in the axial direction of each piezoelectric plate 133 is less than that of the cylindrical portion 221, such that the groove portions 122 are exposed when the piezoelectric plates 133 are placed on the outer circumferential surface of the cylindrical portion 221.

The piezoelectric plates 133 are arranged to be separated from each other and spaced at even intervals around the circumference of the cylindrical portion 221. In the above embodiment, the circumference of the cylindrical portion 221 is divided into four regions and four piezoelectric plates 133 are arranged. However, the number of piezoelectric plates 133 used is not limited to four, and may be any number greater than or equal to three.

The piezoelectric plates 133 may be formed of lead zirconate titanate, crystal, lithium niobate, barium titanate, lead titanate, lead metaniobate, polyvinylidene difluoride, lead zinc niobate, lead scandium niobate, sintered compounds thereof, or the like. The electrodes 131 may be made of nickel, gold, or the like and formed directly on the surface of the piezoelectric plates 133 using techniques such as plating, sputtering, vapor deposition, or thin film printing. The piezoelectric plates 133 and electrodes 131 need not be electrically conductive, and so a plate formed of the electrode material may be provided.

The rotating body 140 includes a circular flange 246 formed at the center thereof in the axial direction, an upper rotation transmitting axle 147 that extends upward from the flange 246, and a lower rotation transmitting axle 148 that extends downward from the flange 246. The outer diameter of the flange 246 is smaller than the inner diameter of the cylindrical portion 221 of the elastic body 120 and is larger than the outer diameters of the upper rotation transmitting axle 147 and the lower rotation transmitting axle 148.

The washer 165 has an inner diameter that is larger than the outer diameter of the upper rotation transmitting axle 147 and smaller than the outer diameter of the flange 246. The biasing member 152 has an outer diameter that is smaller than the outer diameter of the flange 246 and an inner diameter that is larger than the outer diameter of the upper rotation transmitting axle 147.

The upper rotation transmitting axle 147 is inserted through the washer 165 and the biasing member 152 in the stated order. The biasing member 152 is shown as a coil spring in FIG. 21, but is not limited to this type of spring.

The output gear 170 has teeth 176 on the outer circumferential surface thereof and an axle hole 172 in the center thereof. The axle hole 172 has an inner diameter that accommodates the upper rotation transmitting axle 147. When the upper rotation transmitting axle 147 is engaged in the axle hole 172, the output gear 170 rotates integrally with the rotating body 140.

The contact member 310 is cylindrical and has a through hole 312 passing therethrough in the axial direction. The through hole 312 has an inner diameter that is substantially equal to the outer diameter of the lower rotation transmitting axle 148, and the lower rotation transmitting axle 148 is inserted therethrough. The contact member 310 has a plurality of notches 314 on the upper edge of the through hole 312.

The contact member 320 has a through hole 322 passing therethrough in the axial direction. The inner diameter of the through hole 322 is larger than the outer diameter of the lower rotation transmitting axle 148. Therefore, the rotation of the lower rotation transmitting axle 148 inserted through the through hole 322 is prevented.

A bowl-shaped drive surface 321 that gradually slopes downward and inward is formed in the top surface of the contact member 320. The contact member 320 has a plurality of notches 324 on the bottom edge of the outer circumferential surface thereof. The drive surface 321 is formed as a ring along the inner surface of the elastic body 120. The inner diameter of the drive surface 321 is smaller than the outer diameter of the flange 246 of the rotating body 140.

Figure 22:
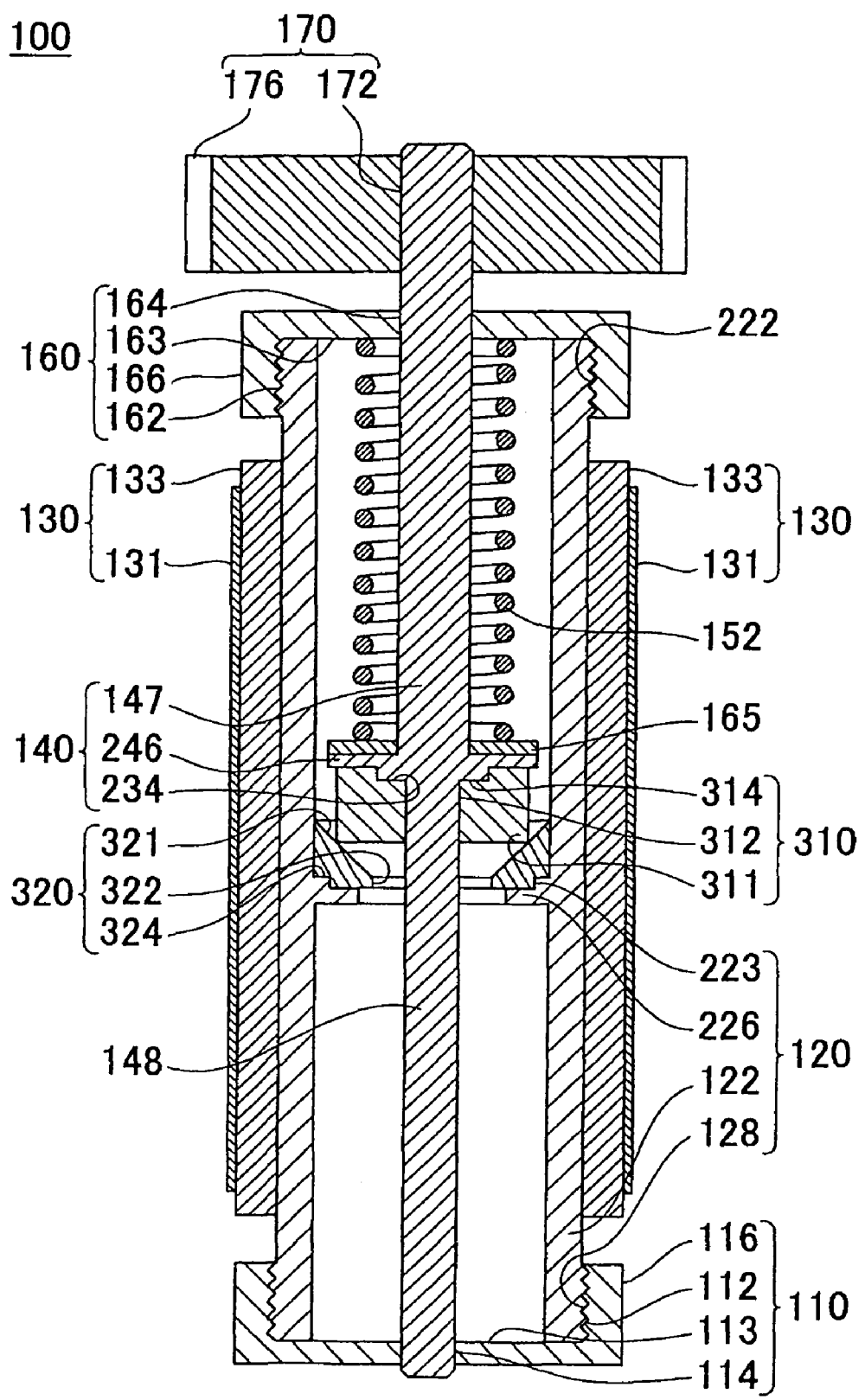
FIG. 22 is a vertical cross-sectional view of the vibration actuator 100.

FIG. 22 is a vertical cross-sectional view of the vibration actuator 100. Components that are the same as those shown in FIG. 21 are given the same reference numerals, and redundant descriptions are omitted.

The elastic body 120 is a cylinder having a through hole passing longitudinally therethrough. The elastic body 120 has a flange 226 formed in the longitudinal center thereof that protrudes inward, and a rotation stopping portion 223 that protrudes from the top surface of the flange 236 and has a shape that is complementary to the notches 324 of the contact member 320.

The electromechanical transducer 130 is arranged on the outer circumferential surface of the elastic body 120. The electromechanical transducer 130 may be adhered thereto, for example, such that the piezoelectric plates 133 directly contact the outer circumferential surface of the elastic body 120. Accordingly, when the piezoelectric plates 133 are deformed, the elastic body 120 is also deformed.

The position setting component 160 and position setting component 110 are attached on the groove portions 122 of the elastic body 120. In the present embodiment, the position setting component 160 and the position setting component 110 are attached by threading the threaded portions 162 and 112 with the groove portions 122, but may instead be attached by adhesion, interlocking, or the like.

The elastic body 120 houses the rotating body 140, the washer 165, and the biasing member 152 therein. The bottom end of the lower rotation transmitting axle 148 of the rotating body 140 protrudes slightly below the bearing unit 114 of the position setting component 110. The top end of the upper rotation transmitting axle 147 of the rotating body 140 protrudes significantly above the bearing unit 164 of the position setting component 160.

In this way, the upper rotation transmitting axle 147 and the lower rotation transmitting axle 148 are rotationally supported by the position setting component 160 and the position setting component 110. The bearing units 164 and 114 may be rolling bearings, sliding bearings, or the like.

The output gear 170 is attached by inserting the top end of the upper rotation transmitting axle 147 through the axle hole 172. As a result, the rotating body 140 rotates together with the output gear 170. In the example of FIG. 22, the output gear 170 is attached to the upper rotation transmitting axle 147. However, the lower rotation transmitting axle 148 may be extended further downward and the output gear 170 may be attached on the bottom end thereof. As another example, output gears 170 may be attached on both the upper rotation transmitting axle 147 and the lower rotation transmitting axle 148.

The top end of the biasing member 152 directly contacts the circular plate portion 163 of the position setting component 160 and the bottom end of the biasing member 152 directly contacts the flange 246 of the rotating body 140 via the washer 165, and the biasing member 152 is compressed in the axial direction. As a result, the rotating body 140 is biased downward via the flange 246.

The washer 165 decreases the sliding friction between the biasing member 152 and the flange 246. Instead of the washer 165 or in addition to the washer 165, lubricant may be applied between the biasing member 152 and the flange 246.

The contact member 310 is provided in contact with the bottom surface of the flange 246 and with the lower rotation transmitting axle 148 inserted therethrough. At this time, the notches 314 interlock with the rotation stopping portion 243, and so the contact member 310 is mounted such that the rotation thereof relative to the rotating body 140 is restricted.

The contact member 320 is supported from below by the flange 226 of the elastic body 120. At this time, the notches 324 interlock with the rotation stopping portion 237, and so the contact member 320 is mounted such that the rotation thereof relative to the elastic body 120 is restricted.

The flange 246 of the rotating body 140 is biased downward by the biasing member 152, and so the drive receiving portion 311 on the bottom edge of the contact member 310 is pressed against the slanted drive surface 321 of the contact member 320. As a result, the movement of the drive surface 321 is efficiently transmitted to the drive receiving portion 311.

The contact members 310 and 320 are formed of a material with higher abrasion resistance than the materials of the rotating body 140 and the elastic body 120. As a result, the effective abrasion of the drive surface 321 and the drive receiving portion 311 is decreased to lengthen the lifespan of the vibration actuator 100. Examples of materials with high abrasion resistance include ceramics such as alumina, silicon carbide, and silicon nitride, as well as hard metals such as tungsten carbide and titanium carbonitride. As another example, a base material formed of high-speed steel whose surface is covered in a thin film of titanium nitride or the like. Engineering plastics such as polyether ether ketone may also be used.

The abrasion resistance of the contact member 310 having the linear drive receiving portion 311 that contacts the drive surface 321 is desirably less than the abrasion resistance of the contact member 320. As a result, even when a large amount of abrasion occurs, the flatness of the drive surface 321 can be maintained to prevent the drive receiving portion 311 from catching on the drive surface 321, and so the lifespan of the vibration actuator 100 can be effectively lengthened. More specifically, the Vickers hardness of the drive receiving portion 311 and drive surface 321 surfaces of the contact members 310 and 320 may be greater than the Vickers hardness of the elastic body 120 or the rotating body 140 to which the contact members 310 and 320 are provided.

In the above embodiment, the contact members 310 and 320 with high abrasion resistance are provided on both the elastic body 120 and the rotating body 140. However, if the elastic body 120 side and the rotating body 140 side have different abrasion resistances, one of the contact members 310 and 320 may be removed and the elastic body 120 or the rotating body 140 may be formed integrally.

Figure 23A:
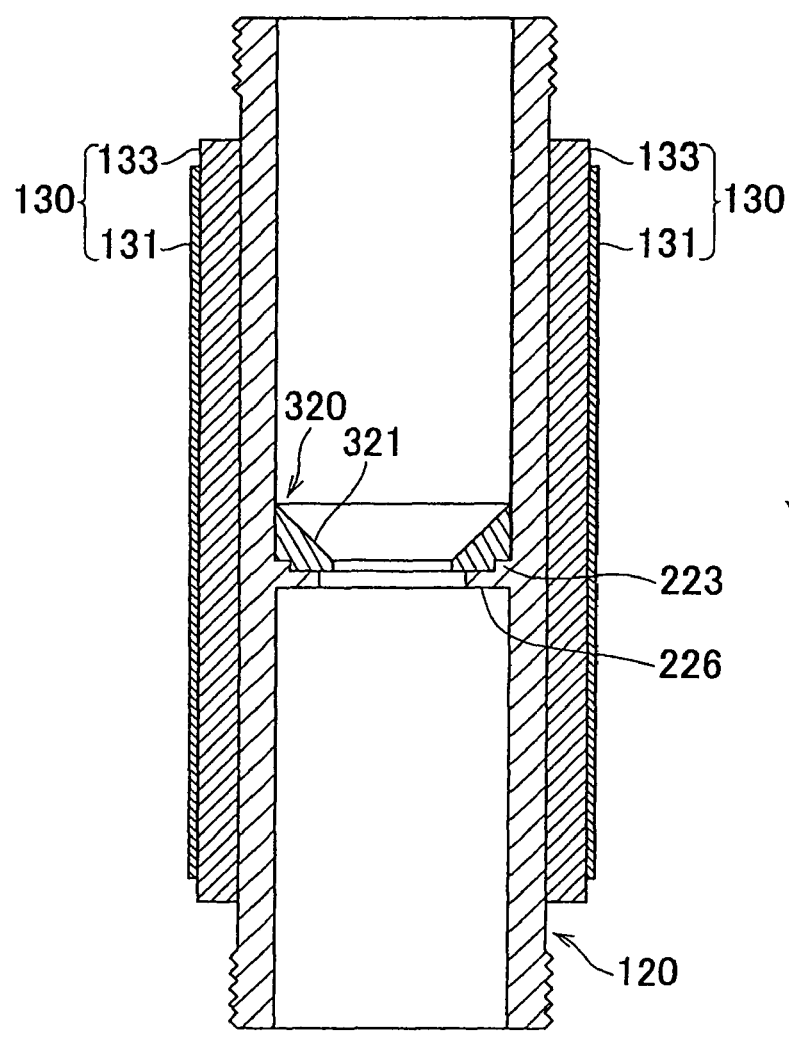
FIGS. 23A and 23B are schematic diagrams showing the operation of the vibration actuator 100.
Figure 23B:
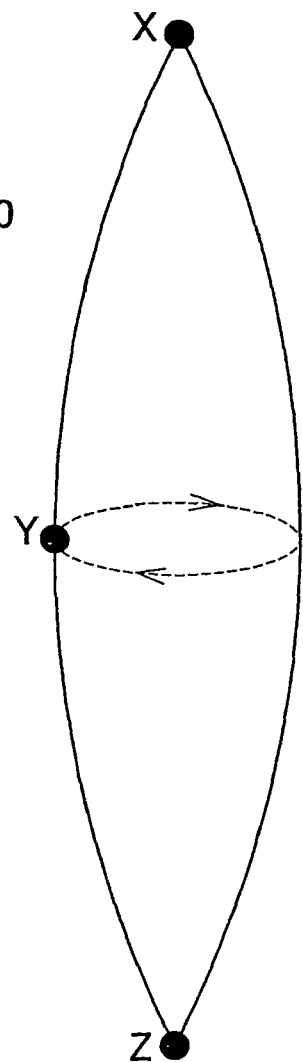

FIGS. 23A and 23B are schematic diagrams showing the operation of the vibration actuator 100. In the present embodiment, the elastic body 120 is supported at both longitudinal ends by the position setting component 110 and the position setting component 160, but may instead be supported at other positions. The elastic body 120 is made of metal, and is held at a reference potential, which may be a ground potential.

In the vibrating system including the elastic body 120 and the electromechanical transducer 130 shown in FIG. 23A, when a drive voltage is applied to an electrode 131 of one of the electromechanical transducers 130, the piezoelectric plate 133 to which this electrode is attached expands in the longitudinal direction. The piezoelectric plates 133 are formed integrally with the cylindrical portion 221 of the elastic body 120 by being adhered thereto, and so the region of the cylindrical portion 221 at which the driven piezoelectric plate 133 is located expands together with the piezoelectric plate 133. As a result, the outer surface of the region of the elastic body 120 to which this piezoelectric plate 133 is attached bends.

When an AC electric field with a phase sequentially delayed by $\pi/2$ is applied to each of the electrodes 131 arranged along the circumference of the elastic body 120, the orientation of the bending of the elastic body 120 sequentially changes. The elastic body 120 is supported at both ends from the outside. Therefore, as shown in FIG. 23B, the entire elastic body 120 vibrates such that the top and bottom ends are nodes Z and X while the longitudinal center forms the antinode Y. The contact member 320 is fixed by being engaged on the inner surface of the elastic body 120, and so the contact member 320 moves in a circle orthogonal to the longitudinal direction according to the vibration of the elastic body 120.

The contact member 310 is pressed by the contact member 320. Accordingly, the drive receiving portion 311 is pressed by the drive surface 321. The horizontal movement of the drive surface 321 due to the vibration of the elastic body 120 is transmitted to the drive receiving portion 311 via the slanted drive surface 321. When the horizontal movement is transmitted to the drive receiving portion 311, the contact member 310 moves in the axial direction against the bias of the biasing member 152.

When the contact member 310 moves in the axial direction, a gap or region with low contact pressure occurs between the drive receiving portion 311 and the drive surface 321. Furthermore, since the vibration causes the movement direction of the drive surface 321 to rotate, the friction causing the contact member 310 to rotate occurs between the drive receiving portion 311 and the drive surface 321. The rotation of the contact member 310 caused by this friction is transmitted to the upper rotation transmitting axle 147 and the output gear 170 via the flange 246, due to the rotation stopping portion 243 engaging with the notch 314.

The horizontal movement of the elastic body 120 caused by the vibration is greatest at the approximate longitudinal center thereof. The contact member 310 and the drive receiving portion 311 contact the drive surface 321 near the antinode Y of the vibration of the contact member 320, and so the vibration of the elastic body 120 is efficiently transmitted to the rotating body 140.

The frequency of the drive voltage applied to the electromechanical transducer 130 desirably includes a resonance frequency corresponding to the characteristic frequency of the vibration system including the electromechanical transducer 130 and the elastic body 120. Therefore, the elastic body 120 is efficiently vibrated by the drive power provided thereto, and this vibration can be continued. The elastic body 120 may have another vibration mode that uses a plurality of nodes and antinodes.

Figure 24:
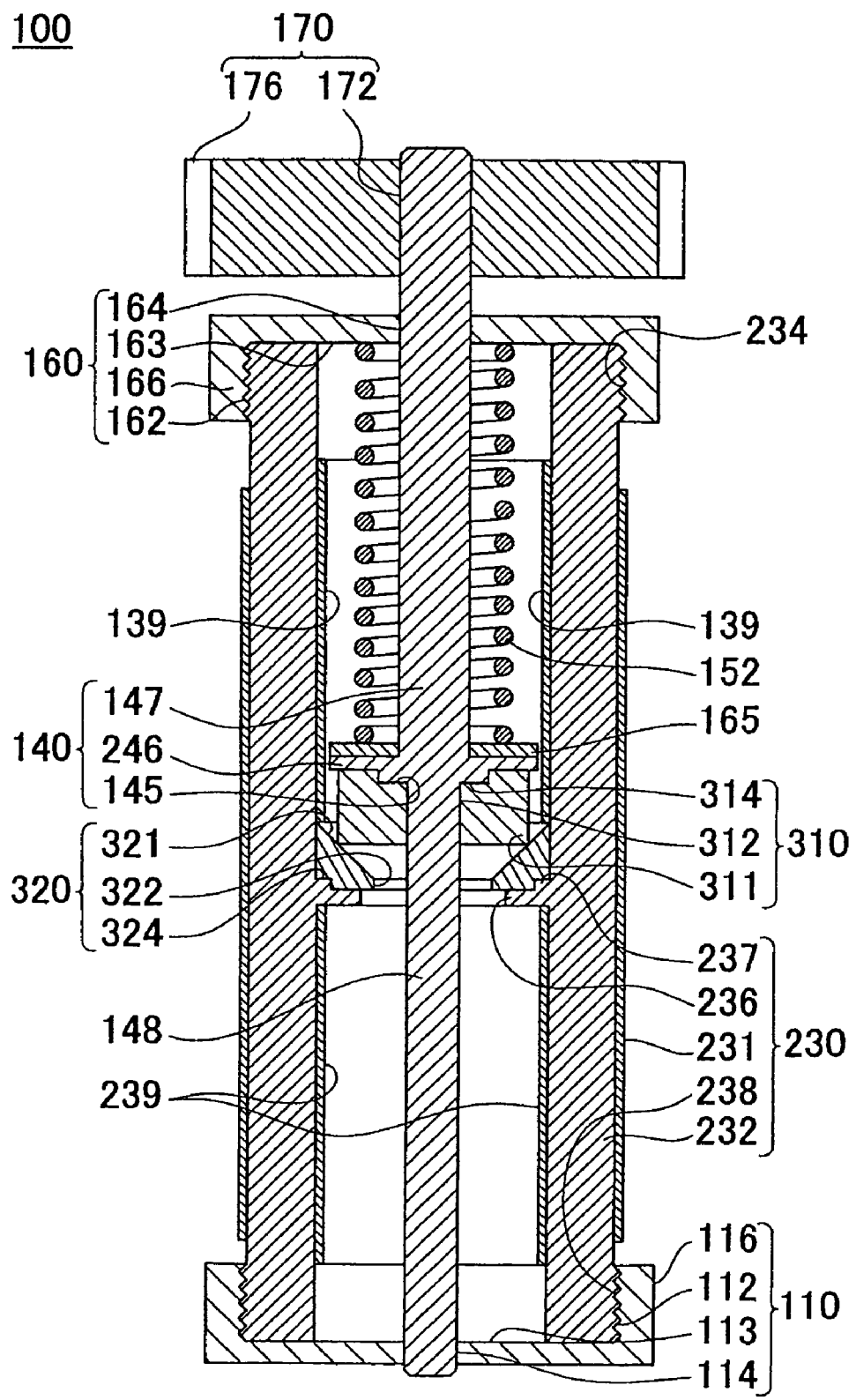
FIG. 24 is a vertical cross-sectional view of a vibration actuator 100 according to another embodiment.

FIG. 24 is a vertical cross-sectional view of the vibration actuator 100 according to another embodiment of the present invention. Aside from the portion described below, the configuration and operation of the vibration actuator 100 is the same as those of the vibration actuator 100 described in other embodiments, and redundant descriptions are omitted.

This vibration actuator 100 includes an electromechanical transducer 230 having a piezoelectric tube 232, an electrode 231, and a common electrode 239. The piezoelectric tube 232 is a cylinder having an inner diameter that is larger than the outer diameter of the rotating body 140. The piezoelectric tube 232 includes groove portions 234 and 238 near the top and bottom ends on the outer circumferential surface thereof. The groove portions 234 and 238 have inner diameters and pitches that enable threading with the threaded portions 162 and 112 of the position setting component 160 and position setting component 110.

The piezoelectric tube 232 has a flange 236 formed at the longitudinal center thereof protruding inward, and a rotation stopping portion 237 that protrudes from the top surface of the flange 236. The rotation stopping portion 237 has a shape that is complementary to the notches 324 of the contact member 320. The contact member 320 inserted into the piezoelectric tube 232 is supported from below by the flange 236 and is pressed downward by the biasing member 152 via the contact member 310. At this time, the notches 324 and rotation stopping portion 237 are engaged with each other, and so the contact member 320 is fixed to prevent rotation inside the piezoelectric tube 232.

Four electrodes 231 are provided at four regions obtained by evenly dividing the outer circumferential surface of the piezoelectric tube 232. The electrodes 231 are electrically isolated from each other and voltage is applied to the electrodes 231 individually. The common electrode 239 is formed continuously over the entire inner surface of the piezoelectric tube 232, except for the region of the flange 236. The common electrode 239 may be held at a reference voltage, such as a ground potential.

In the above embodiment, the electromechanical transducer 230 has four electrodes 231. However the number of electrodes 231 is not limited to four, and may be any number greater than or equal to three.

In the vibration actuator 100 having the above configuration, when a voltage is applied between one of the electrodes 131 and the common electrode 239, the region of the piezoelectric plate 133 corresponding to this electrode 131 expands longitudinally. As a result, this region of the piezoelectric tube 232 expands to bend in the longitudinal direction.

If the common electrode 239 is held at the ground potential and the voltage is sequentially applied to the electrodes 131, the elastic body 120 vibrates such that the bending direction changes to the circumferential direction. As described above, the movement of the drive surface 321 of the contact member 320 supported by the piezoelectric tube 232 is converted and transmitted as the rotational movement of the drive receiving portion 311.

Figure 25:
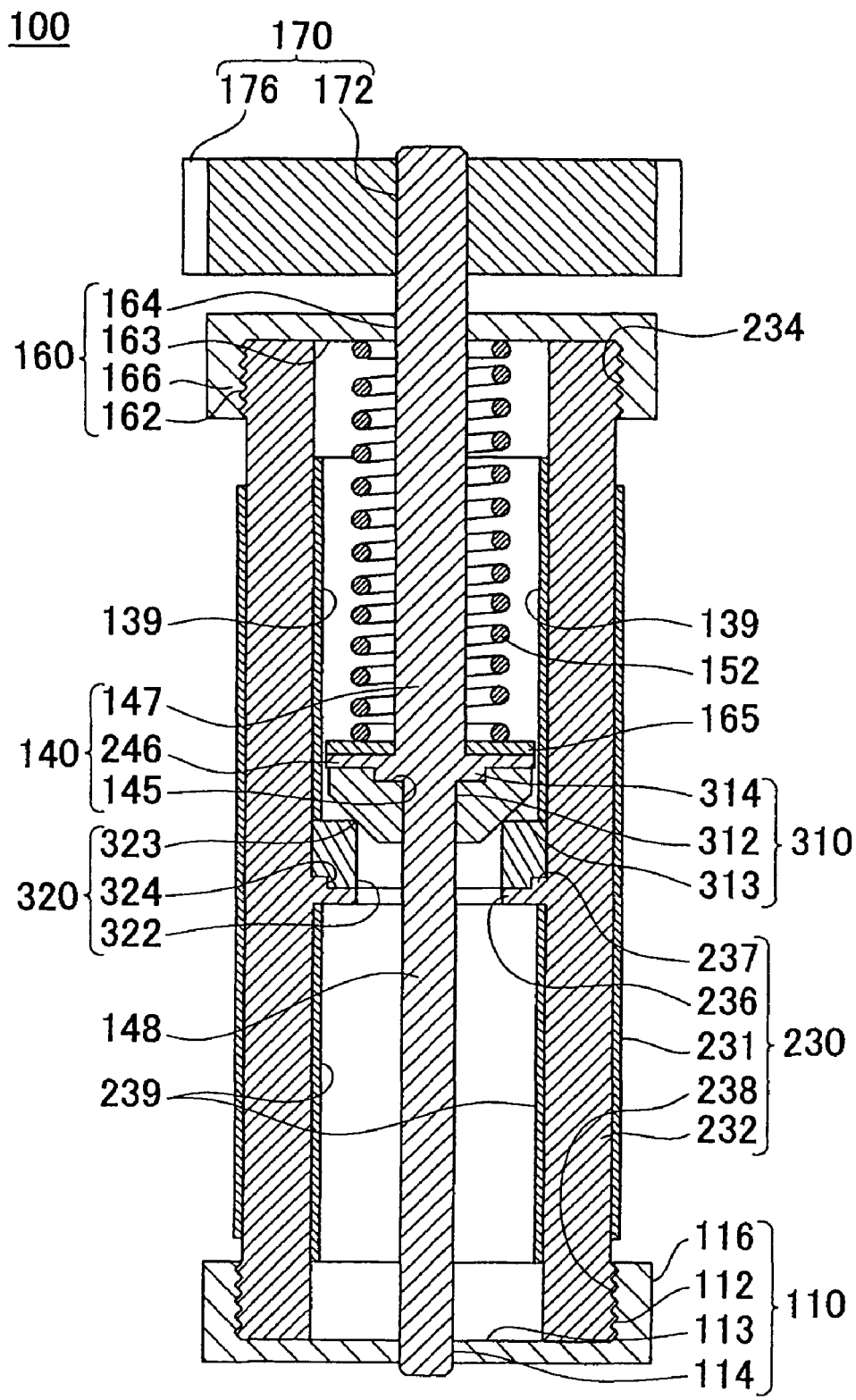
FIG. 25 is a vertical cross-sectional view of a vibration actuator 100 according to another embodiment.

FIG. 25 is a vertical cross-sectional view of the vibration actuator 100 according to another embodiment of the present invention. Aside from the portion described below, the configuration and operation of the vibration actuator 100 is the same as those of the vibration actuator 100 described in FIG. 24, and redundant descriptions are omitted.

This vibration actuator 100 has a characteristic feature relating to the form of the contact members 310 and 320. Specifically, the contact member 310 provided to the rotating body 140 has a tapered drive receiving surface 313 that is thicker in the region radially closer to the lower rotation transmitting axle 148. The contact member 320 provided to the elastic body 120 has a drive unit 323 with a horizontal top surface at the top edge of the through hole 322. As a result, the horizontal component of the movement of the contact member 320 caused by the vibration of the elastic body 120 is transmitted to the rotating body 140 via the drive receiving surface 313.

Here, the abrasion resistance of the contact member 320 having the horizontal drive unit 323 that contacts the drive receiving surface 313 is desirably less than the abrasion resistance of the contact member 310. As a result, even when a large amount of abrasion occurs, the flatness of the drive receiving surface 313 can be maintained to prevent the drive unit 323 from catching on the drive receiving surface 313, and so the lifespan of the vibration actuator 100 can be effectively lengthened.

In the above embodiment, the contact members 310 and 320 with high abrasion resistance are provided on both the elastic body 120 and the rotating body 140. However, if the elastic body 120 side and the rotating body 140 side have different abrasion resistances, one of the contact members 310 and 320 may be removed and the elastic body 120 or the rotating body 140 may be formed integrally.

Figure 26:
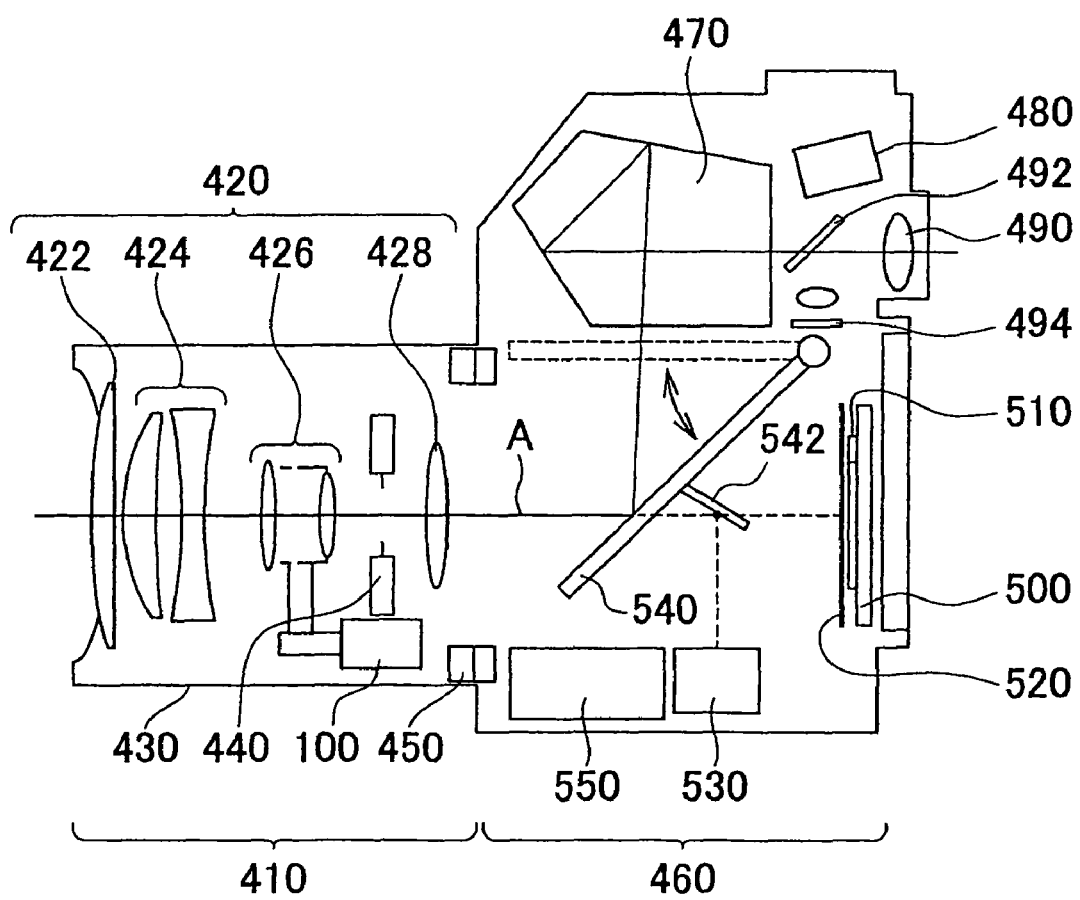
FIG. 26 is a vertical schematic cross-sectional view of the configuration of an image capturing apparatus 400.

FIG. 26 is a schematic cross-sectional view of the configuration of an image capturing apparatus 400. The image capturing apparatus 400 includes a lens unit 410 and a body 460. The lens unit 410 is provided to be attachable to and detachable from the body 460, via a mount 450. The lens unit 410 includes an optical component 420, a barrel 430 that houses the optical component 420, and a vibration actuator 100 that is provided in the barrel 430 and drives the optical component 420.

The optical component 420 includes a front lens 422, a compensator lens 424, a focusing lens 426, and a main lens 428 arranged in the stated order from the left side of FIG. 26, which is the end at which light enters. An iris unit 440 is arranged between the focusing lens 426 and the main lens 428.

The vibration actuator 100 is arranged below the focusing lens 426 with a relatively small diameter in the approximant center of the barrel 430 in the direction of the optical axis. As a result, the vibration actuator 100 can be housed in the barrel 430 without increasing the diameter of the barrel 430. The vibration actuator 100 may cause the focusing lens 426 to move forward or backward along a track in the direction of the optical axis, for example.

The body 460 houses an optical component that includes a main mirror 540, a pentaprism 470, and an eyepiece system 490. The main mirror 540 moves between a standby position, in which the main mirror 540 is arranged diagonally in the optical path of the light incident through the lens unit 410, and an image capturing position, shown by the dotted line in FIG. 26, in which the main mirror 540 is raised above the optical path of the incident light.

When in the standby position, the main mirror 540 guides the majority of the incident light toward the pentaprism 470 arranged thereabove. The pentaprism 470 projects the reflection of the incident light toward the eyepiece system 490, and so the image on the focusing screen, not shown, can be seen correctly from the eyepiece system 490. The remaining incident light is guided to the light measuring unit 480 by the pentaprism 470. The light measuring unit 480 measures the intensity of this incident light, as well as a distribution or the like of this intensity.

A half mirror 492 that superimposes the display image formed by the finder liquid crystal 494 onto the image of the focusing screen is arranged between the pentaprism 470 and the eyepiece system 490. The display image is displayed superimposed on the image projected from the pentaprism 470.

The main mirror 540 has a sub-mirror 542 formed on the back side of the surface facing the incident light. The sub-mirror 542 guides a portion of the incident light passed through the main mirror 540 to the distance measuring unit 530 arranged therebelow. Therefore, when the main mirror 540 is in the standby position, the distance measuring unit 530 can measure the distance to the subject. When the main mirror 540 moves to the image capturing position, the sub-mirror 542 is also raised above the optical path of the incident light.

A shutter 520, an optical filter 510, and an image capturing element 500 are arranged to the rear of the main mirror 540 in the stated order. When the shutter 520 is open, the main mirror 540 arranged immediately in front of the shutter 520 moves to the image capturing position, and so the incident light travels to the image capturing element 500. As a result, the image formed by the incident light can be converted into an electric signal.

In the image capturing apparatus 400, the lens unit 410 and the body 460 are electrically connected to each other. Therefore, an autofocus mechanism can be formed by controlling the rotation of the vibration actuator 100 according to the information concerning the distance to the subject detected by the distance measuring unit 530 in the body 460, for example. As another example, a focus aid mechanism can be formed by the distance measuring unit 530 referencing the movement amount of the vibration actuator 100.

The above describes a case in which the focusing lens 426 is moved by the vibration actuator 100, but the vibration actuator 100 may instead drive opening and closing of the iris unit 440, movement of the variator lens in a zoom lens, or the like. In such a case, by exchanging information with the light measuring unit 480 and the finder liquid crystal 494 in the form of electric signals, the vibration actuator 100 can achieve automatic exposure, scene mode execution, bracket image capturing, or the like. These operations are performed under the control of the control apparatus 550 housed at the bottom of the body 460.

The vibration actuator 100 is provided to have its length parallel to the optical axis of the lens unit 410. In other words, the vibration actuator 100 is provided such hat the rotating body 140 is oriented horizontally.

Accordingly, the vibration actuator 100 can be used to drive a focusing mechanism, zoom mechanism, or blur correcting mechanism in an image capturing device or binoculars, for example, with favorable results. However, use of the vibration actuator 100 is not limited to these situations.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A vibration actuator comprising:
    an elastic body;
    an electromechanical transducer that causes the elastic body to vibrate; and
    a rotating body that rotates in response to a drive force received from contact with a portion of the elastic body at a vibrational antinode thereof, the portion being other than an end of the elastic body, wherein
    the elastic body includes an elastic body contact member that is arranged in a region that includes the vibrational antinode of the elastic body,
    the rotating body includes a rotating body contact member that receives a drive force by contacting the elastic body contact member,
    one of the elastic body contact member and the rotating body contact member has a contact surface that is oriented diagonally to the axis of rotation and contacts the other of the elastic body contact member and the rotating body contact member,
    the elastic body is cylindrical, and
    the rotating body contact member contacts an inner surface of the elastic body.

2. The vibration actuator according to claim 1, wherein the electromechanical transducer includes three or more electromechanical transducer elements arranged on an outer surface of the elastic body at different positions in a circumferential direction of the elastic body.

3. The vibration actuator according to claim 2, wherein the rotating body includes a rotation transmitting axle that transmits the rotation of the rotating body contact member to outside the elastic body, and
the rotation transmitting axle has an outer diameter at each position along the axis of rotation such that a difference between the outer diameter and an inner diameter of the elastic body is greater than an amplitude of the vibration at the corresponding position.

4. The vibration actuator according to claim 3, wherein the rotating body contact member has an outer diameter that is greater than the outer diameter of the rotation transmitting axle at each position along the axis of rotation.

5. The vibration actuator according to claim 1, wherein the elastic body contact member is arranged at a position other than an end of the elastic body.

6. The vibration actuator according to claim 5, wherein the elastic body contact member and the rotating body contact member are arranged near a longitudinal center of the elastic body.

7. The vibration actuator according to claim 6, wherein the elastic body has bending rigidity at a portion thereof where the vibrational antinode occurs that is less than the bending rigidity at other portions thereof.

8. The vibration actuator according to claim 7, wherein the elastic body has a thickness at the portion thereof where the vibrational antinode occurs that is less than the thickness at other portions thereof.

9. The vibration actuator according to claim 7, wherein the elastic body has a notch formed at the portion thereof where the vibrational antinode occurs.

10. The vibration actuator according to claim 7, further comprising a biasing unit that biases the rotating body contact member toward the elastic body contact member.

11. The vibration actuator according to claim 7, wherein the rotating body contact member is shaped as a cylinder or a circular truncated cone,
the elastic body contact member has a shoulder portion that locks the rotating body contact member in the direction of the axis of rotation, and
the vibration actuator further comprises a biasing unit that biases the rotating body contact member toward the shoulder portion in the direction of the axis of rotation.

12. The vibration actuator according to claim 1, wherein the elastic body includes:
    a first inner surface with a first diameter;
    a second inner surface with a second diameter that is smaller than the first diameter; and a drive surface formed between the first and second surfaces, and the rotating body contacts the drive surface.

13. A vibration actuator comprising:
an elastic body;
an electromechanical transducer that causes the elastic body to vibrate; and
a rotating body that rotates in response to a drive force received from contact with the elastic body at a vibrational antinode thereof, wherein
the elastic body has bending rigidity at a portion thereof where the vibrational antinode occurs that is less than the bending rigidity at other portions thereof, and
the elastic body has a thickness at the portion thereof where the vibrational antinode occurs that is less than the thickness at other portions thereof.

14. The vibration actuator according to claim 13, wherein the elastic body has a notch formed at the portion thereof where the vibrational antinode occurs.

15. The vibration actuator according to claim 13, wherein
the portion is other than an end of the elastic body, and
the rotating body contacts the portion of the elastic body.

16. The vibration actuator according to claim 15, wherein the elastic body includes:
   a first inner surface with a first diameter;
   a second inner surface with a second diameter that is smaller than the first diameter; and
   a drive surface formed between the first and second surfaces, and
the rotating body contacts the drive surface.

17. A lens unit comprising:
an optical component;
a barrel that houses the optical component; and
a vibration actuator that is provided in the barrel and drives the optical component,
wherein the vibration actuator includes:
   an elastic body;
   an electromechanical transducer that causes the elastic body to vibrate; and
   a rotating body that rotates in response to a drive force received from contact with the elastic body at a vibrational antinode thereof,
wherein the rotating body contacts the elastic body at a prescribed position along a direction in which an axis of the rotation extends,
wherein the rotating body contacts a portion of the elastic body at a vibrational antinode thereof, the portion being other than an end of the elastic body,
wherein the elastic body includes:
   a first inner surface with a first diameter;
   a second inner surface with a second diameter that is smaller than the first diameter; and
   a drive surface formed between the first and second surfaces, and
wherein the rotating body contacts the drive surface.

18. The lens unit according to claim 17, wherein
the optical component includes a focusing lens, and
the vibration actuator causes the focusing lens to move forward or backward in the direction of an optical axis.

19. An image capturing apparatus comprising:
an optical component;
a vibration actuator that drives the optical component; and
an image capturing section that captures an image focused by the optical component,
wherein the vibration actuator includes:
   an elastic body;
   an electromechanical transducer that causes the elastic body to vibrate; and
   a rotating body that rotates in response to a drive force received from contact with the elastic body at a vibrational antinode thereof,
wherein the rotating body contacts the elastic body at a prescribed position along a direction in which an axis of the rotation extends,
wherein the rotating body contacts a portion of the elastic body at a vibrational antinode thereof, the portion being other than an end of the elastic body,
wherein the elastic body includes:
   a first inner surface with a first diameter;
   a second inner surface with a second diameter that is smaller than the first diameter; and
   a drive surface formed between the first and second surfaces, and the rotating body contacts the drive surface.

20. The image capturing apparatus according to claim 19, wherein
the optical component includes a focusing lens, and
the vibration actuator causes the focusing lens to move forward or backward in the direction of an optical axis.

* * * * *

UNITED STATES PATENT AND TRADEMARK OFFICE
CERTIFICATE OF CORRECTION

PATENT NO. : 8,344,591 B2
APPLICATION NO. : 12/659494
DATED : January 1, 2013
INVENTOR(S) : Yoshihiko Suzuki et al.

It is certified that error appears in the above-identified patent and that said Letters Patent is hereby corrected as shown below:

On the Title Page, Col. 1, Item (63) Related U.S. Application Data, insert -- Continuation of application No. PCT/JP2008/065771, filed on Sep. 2, 2008. --, therefor.

Signed and Sealed this
Fourth Day of June, 2013

Teresa Stanek Rea
*Acting Director of the United States Patent and Trademark Office*